US011665061B2

(12) United States Patent
Nakano et al.

(10) Patent No.: US 11,665,061 B2
(45) Date of Patent: May 30, 2023

(54) VIRTUAL NETWORK SYSTEM, VIRTUAL NETWORK CONTROL METHOD, VIRTUAL NETWORK FUNCTION DATABASE, ORCHESTRATION APPARATUS, CONTROL APPARATUS, AND CONTROL METHOD AND CONTROL PROGRAM OF CONTROL APPARATUS

(71) Applicant: NEC CORPORATION, Tokyo (JP)

(72) Inventors: Shintaro Nakano, Tokyo (JP); Hideo Hasegawa, Tokyo (JP); Satoru Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 15/548,147

(22) PCT Filed: Jan. 14, 2016

(86) PCT No.: PCT/JP2016/050970
§ 371 (c)(1),
(2) Date: Aug. 2, 2017

(87) PCT Pub. No.: WO2016/125554
PCT Pub. Date: Aug. 11, 2016

(65) Prior Publication Data
US 2018/0048523 A1      Feb. 15, 2018

(30) Foreign Application Priority Data
Feb. 3, 2015   (JP) .............................. JP2015-019798

(51) Int. Cl.
*H04L 41/0873* (2022.01)
*G06F 9/445* (2018.01)
(Continued)

(52) U.S. Cl.
CPC ............ *H04L 41/0873* (2013.01); *G06F 8/60* (2013.01); *G06F 9/44536* (2013.01);
(Continued)

(58) Field of Classification Search
None
See application file for complete search history.

(56) References Cited

U.S. PATENT DOCUMENTS 6,205,445 B1    3/2001  Tokuyama
9,384,028 B1 *  7/2016  Felstaine ............... H04L 45/586
(Continued)

FOREIGN PATENT DOCUMENTS

CN   104253866 A    12/2014
EP   0 950 948 A2   10/1999
(Continued)

OTHER PUBLICATIONS

Atsumori Sasaki, "Gijutsu Kaisetsu 5 Kaso Appliance ni yoru Cloud Un yo no Henkaku—Virtual Appliance Development Process ni yoru Kaso Appliance-ka—", Provision, Feb. 7, 2014, pp. 50-55, No. 80.
(Continued)

*Primary Examiner* — Chris Parry
*Assistant Examiner* — Abderrahmen Chouat
(74) *Attorney, Agent, or Firm* — Sughrue Mion, PLLC

(57) ABSTRACT

A system according to this invention is directed to a virtual network system that selects a virtual network function of an appropriate version and prevents a malfunction of a virtual network when an operator is to provide a virtual network service based on virtual network functions. The virtual network system includes an instructor that instructs activation or change of a virtual network function preregistered and providing one of functions included in a virtual network service, a confirmation unit that confirms that the virtual
(Continued)

network function instructed to be activated or changed is appropriate, based on version information added at a time of registering the virtual network function, and a setting unit that sets, when the confirmation unit confirms that the virtual network function instructed to be activated or changed is appropriate, the instructed virtual network function as the one of the functions included in the virtual network service.

22 Claims, 39 Drawing Sheets

(51) Int. Cl.
    *G06F 8/60*         (2018.01)
    *H04L 41/0806*    (2022.01)
    *H04L 12/46*      (2006.01)
    *H04L 41/0816*    (2022.01)
    *H04L 41/50*      (2022.01)
    *H04L 41/0893*    (2022.01)

(52) U.S. Cl.
    CPC .......... *H04L 12/46* (2013.01); *H04L 41/0806* (2013.01); *H04L 41/0816* (2013.01); *H04L 41/50* (2013.01); *H04L 12/4641* (2013.01); *H04L 41/0893* (2013.01)

(56) References Cited

U.S. PATENT DOCUMENTS

| | | | |
|---|---|---|---|
| 9,760,428 B1* | 9/2017 | Felstaine | H04W 28/00 |
| 2002/0032854 A1 | 3/2002 | Chen et al. | |
| 2003/0159135 A1 | 8/2003 | Hiller et al. | |
| 2005/0010915 A1* | 1/2005 | Chen | G06F 8/65 |
| | | | 717/170 |
| 2007/0169103 A1 | 7/2007 | Bhatkhande et al. | |
| 2010/0005166 A1* | 1/2010 | Chung | H04L 43/0817 |
| | | | 709/224 |
| 2010/0071069 A1 | 3/2010 | Sugiura et al. | |
| 2011/0161952 A1 | 6/2011 | Poddar et al. | |
| 2012/0131566 A1* | 5/2012 | Morgan | G06F 8/65 |
| | | | 717/170 |
| 2013/0263113 A1 | 10/2013 | Cavazza et al. | |
| 2014/0201374 A1 | 7/2014 | Ashwood-Smith et al. | |
| 2014/0317261 A1 | 10/2014 | Shatzkamer et al. | |
| 2014/0317293 A1 | 10/2014 | Shatzkamer | |
| 2014/0325644 A1* | 10/2014 | Oberg | G06F 21/57 |
| | | | 726/22 |
| 2016/0337172 A1* | 11/2016 | Yu | H04L 67/34 |
| 2016/0364226 A1* | 12/2016 | Takano | G06F 9/45558 |
| 2017/0187572 A1* | 6/2017 | Wu | H04L 41/082 |
| 2017/0214694 A1* | 7/2017 | Yan | H04L 63/0853 |
| 2017/0244596 A1* | 8/2017 | Chen | H04L 12/1407 |

FOREIGN PATENT DOCUMENTS

| | | | |
|---|---|---|---|
| JP | 2002-164938 A | 6/2002 | |
| JP | 2010-067230 A | 3/2010 | |
| JP | 2011-034403 A | 2/2011 | |
| JP | 2011170528 A | 9/2011 | |
| JP | 2013-516668 A | 5/2013 | |
| JP | 2013-544402 A | 12/2013 | |
| WO | 2006/064561 A1 | 6/2006 | |
| WO | WO-2016041360 A1 * | 3/2016 | ............... G06F 8/61 |

OTHER PUBLICATIONS

International Search Report of PCT/JP2016/050970 dated Mar. 29, 2016.
Communication dated Jan. 24, 2019, from the European Patent Office in counterpart European Application No. 16746385.0.
Extended European Search Report dated Apr. 25, 2019, from the European Patent Office counterpart Application No. 16746385.0.
Huawei Technologies, "Software Validation", NFV SEC #22, NFVSEC(14)022004, Feb. 12, 2014, pp. 1-2(2 pages total).
"ETSI GS NFV-SEC 003 V1.1.1 Network Functions Virtualisation (NFV); NFV Security; Security and Trust Guidance", Sophia Antipolis Cedex, France, Dec. 1, 2014, pp. 1-57(57 total pages).
Ericsson, "Network Functions Virtualization and Software Management", Ericsson White Paper, Dec. 1, 2014, pp. 1-9 (9 pages total).
Communication dated Nov. 13, 2018 from the Japan Patent Office in counterpart Japanese Machine application No. 2016-573255.

\* cited by examiner

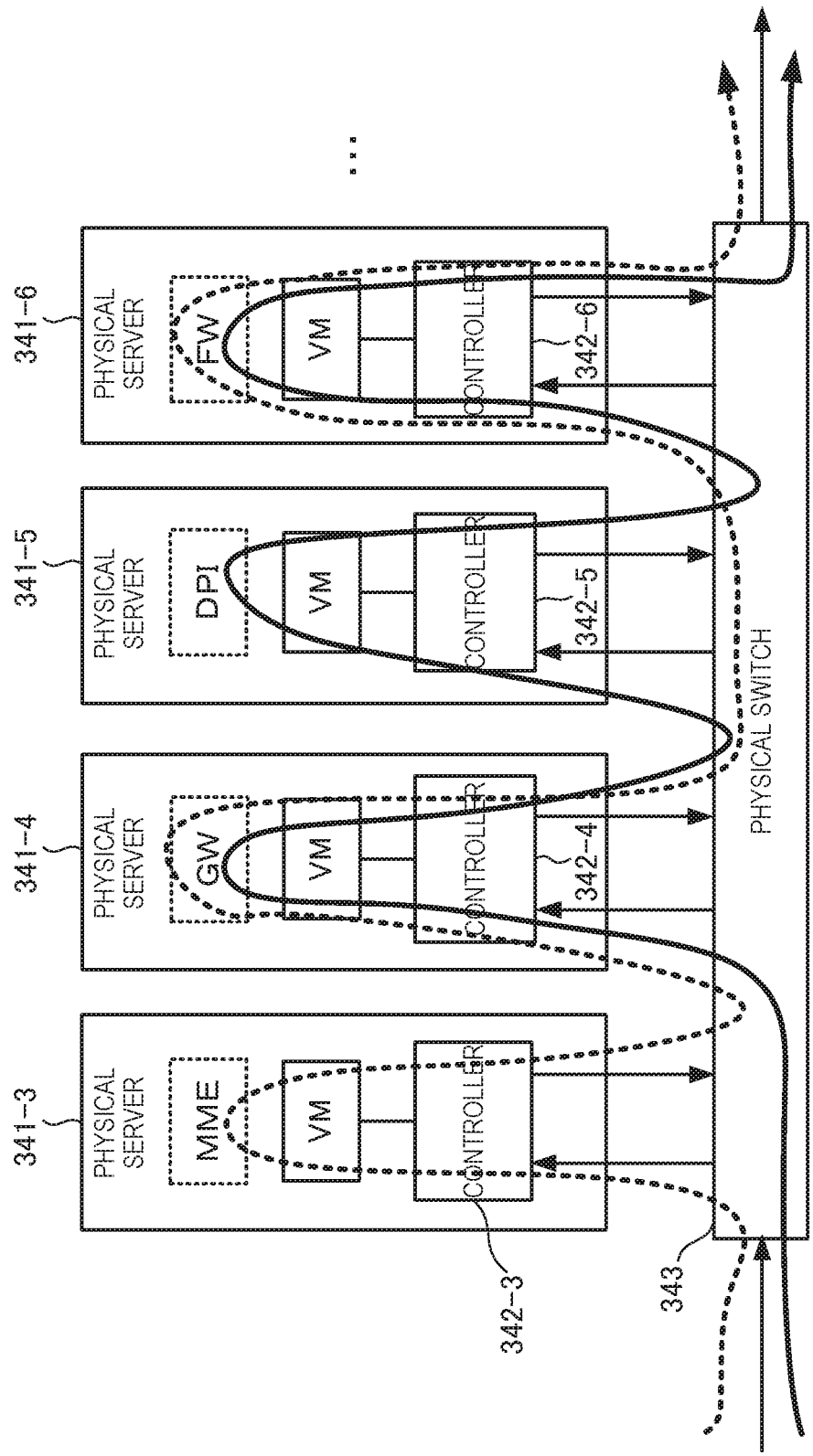

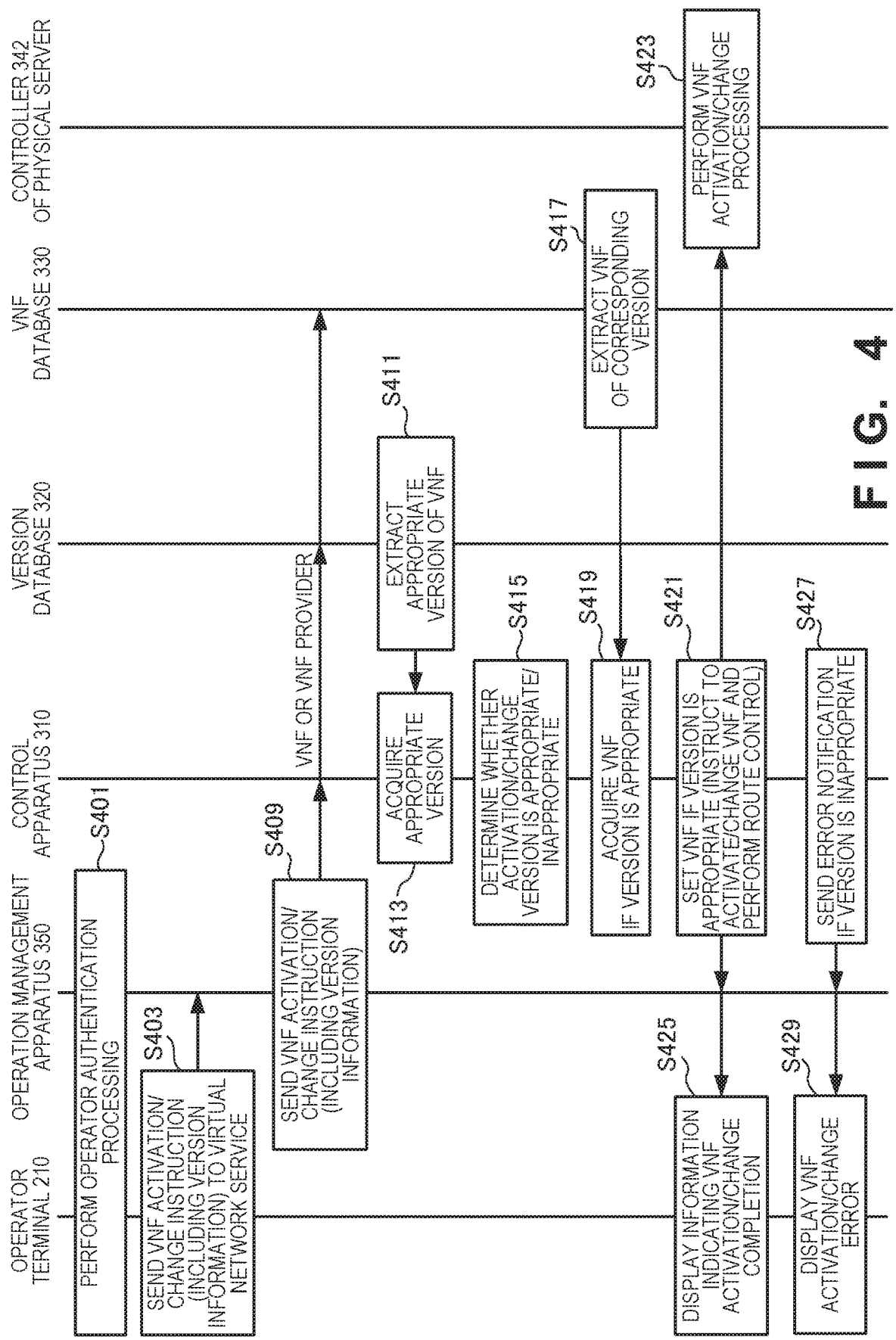

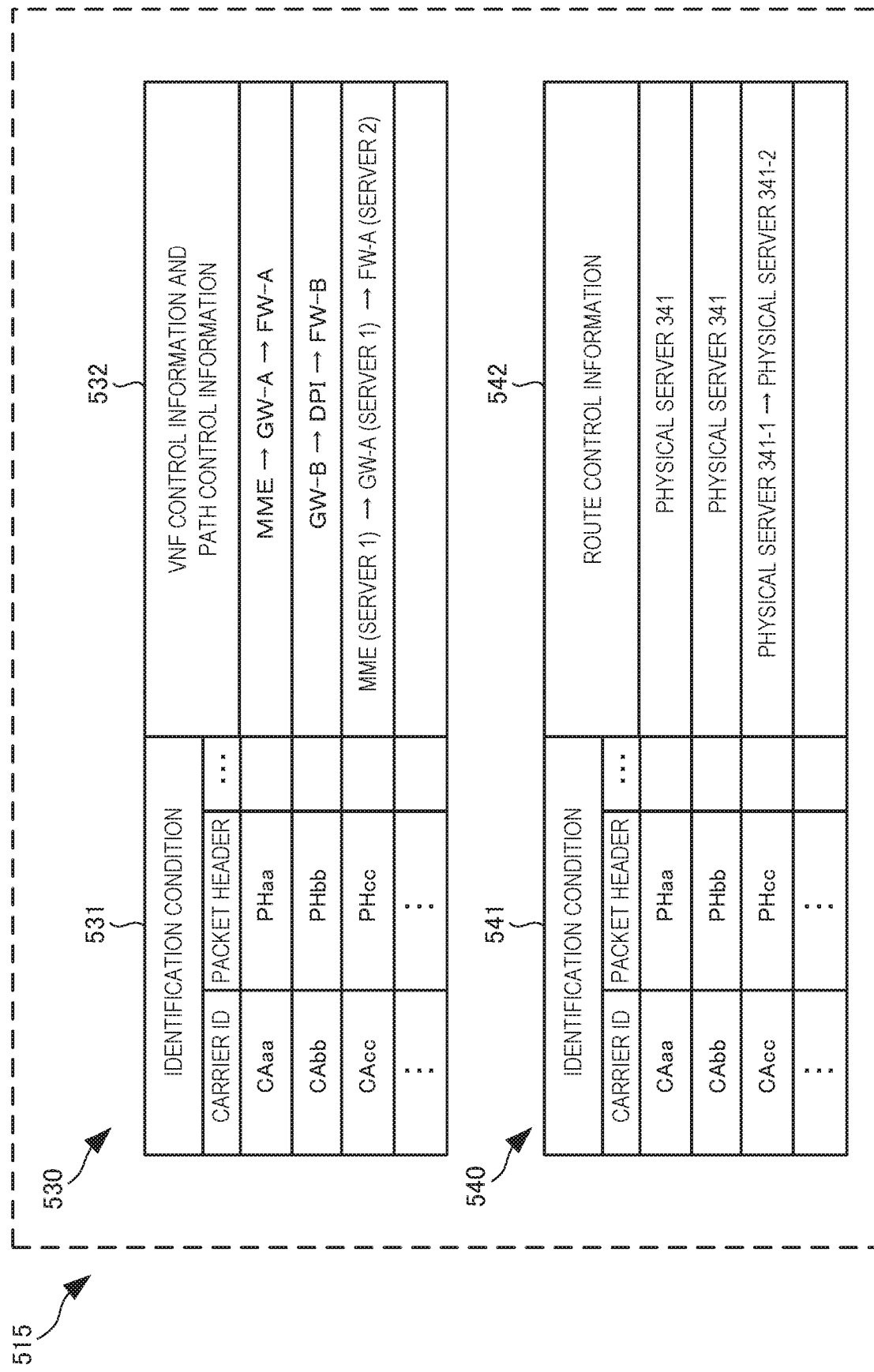

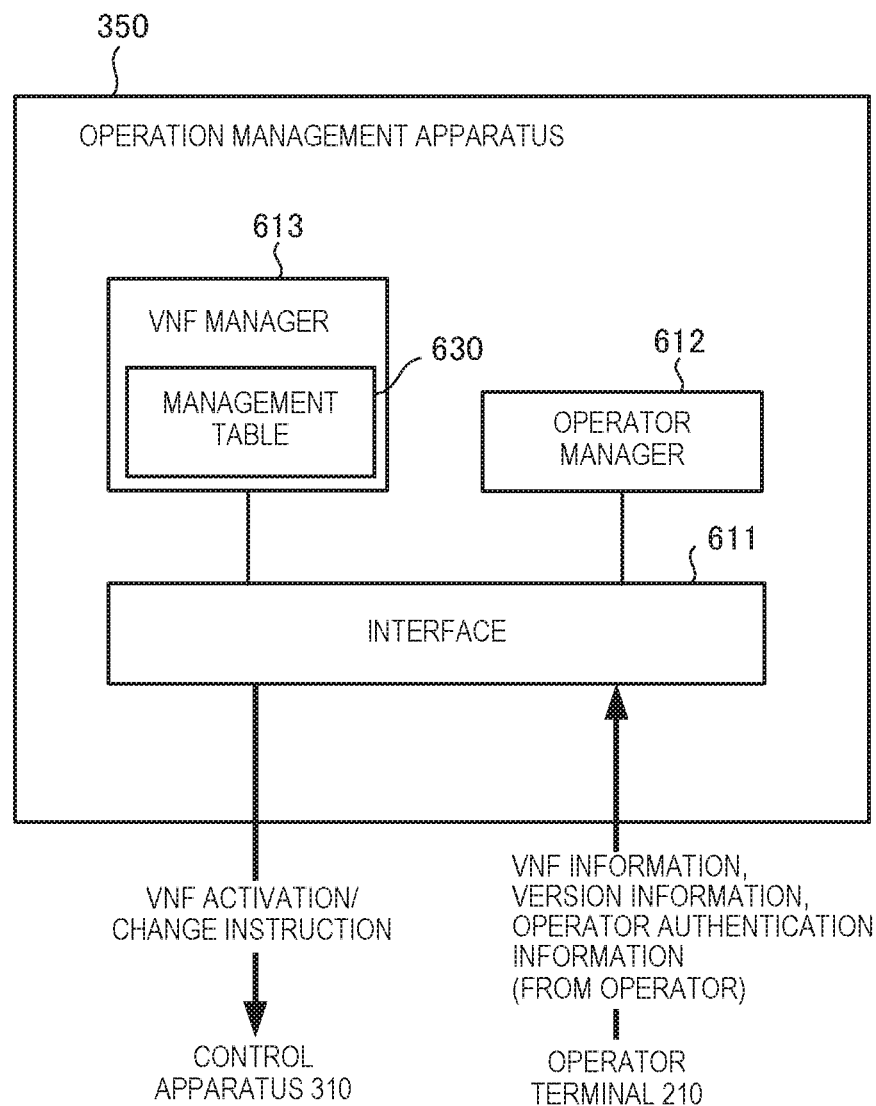
F I G. 6A

FIG. 7B

| VIRTUAL NETWORK SERVICE ID | CURRENTLY USED VNF 712 | | | ACTIVATABLE/CHANGEABLE VNF 713 | | | UNACTIVATABLE/UNCHANGEABLE VNF 714 | | |
|---|---|---|---|---|---|---|---|---|---|
| 711 | FUNCTION | VNF PROVIDER | VERSION INFORMATION | ... | FUNCTION | VNF PROVIDER | VERSION INFORMATION | FUNCTION | VNF PROVIDER | VERSION INFORMATION |
| | | | | | | | | | | |
| | ... | | | | ... | | | ... | | |
| | | | | | | | | | | |
| ... | ... | | | | ... | | | ... | | |

320

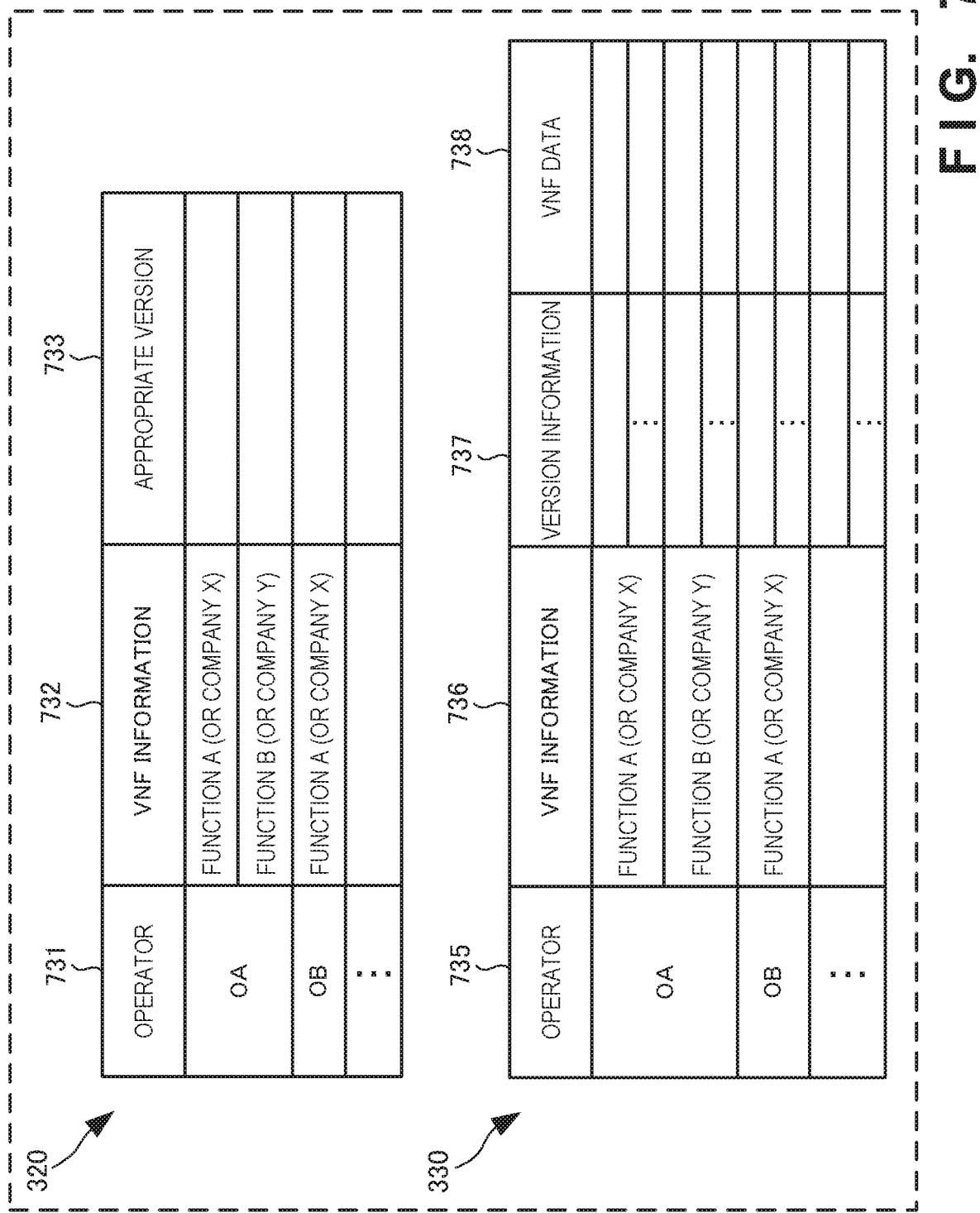

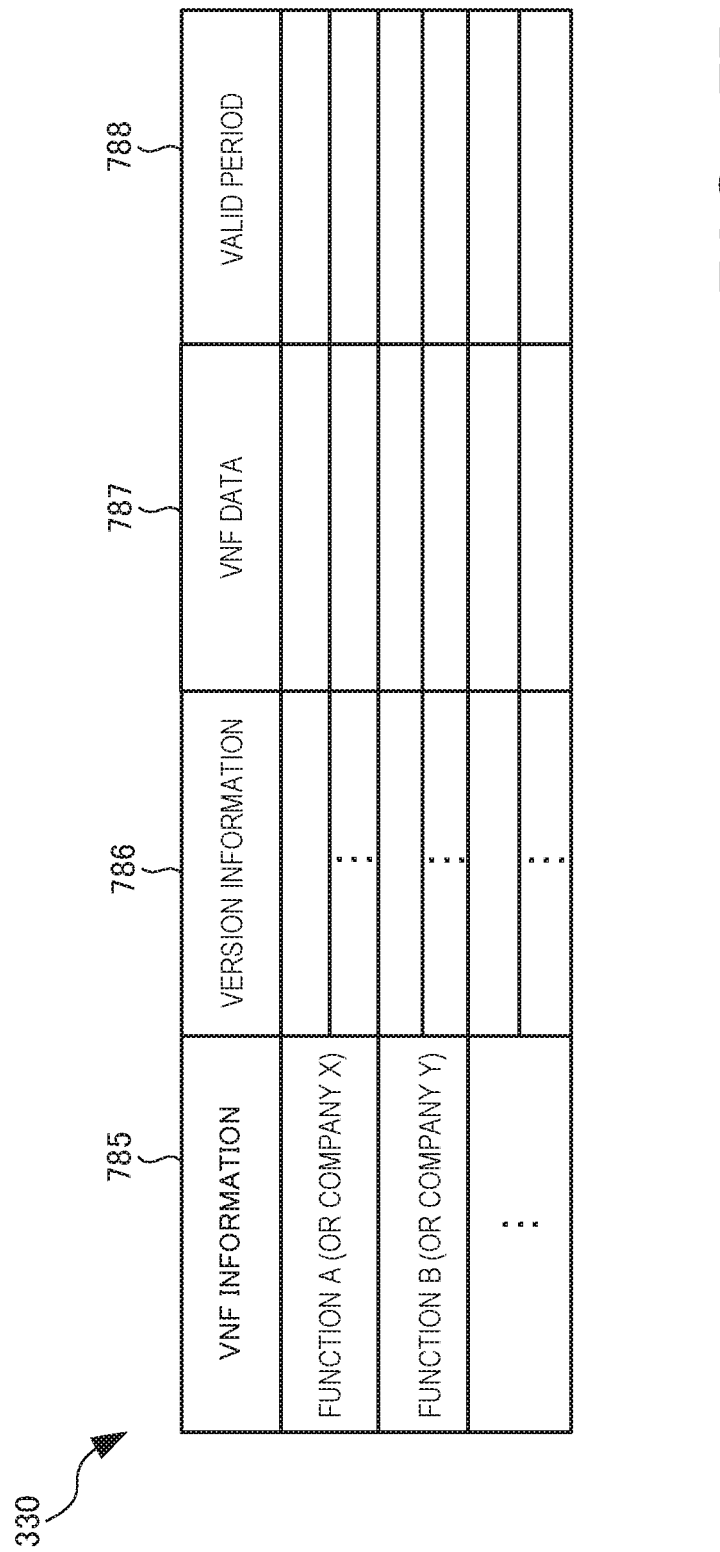

| PROVIDER INFORMATION (THIRD PARTY) | REGISTRABLE/UPDATABLE FUNCTION |
|---|---|
| COMPANY X | FUNCTION A |
| COMPANY Y | FUNCTION B |
| COMPANY Z | FUNCTION C |
| | FUNCTION D |
| | ⋮ |
| ⋮ | |

FIG. 13B

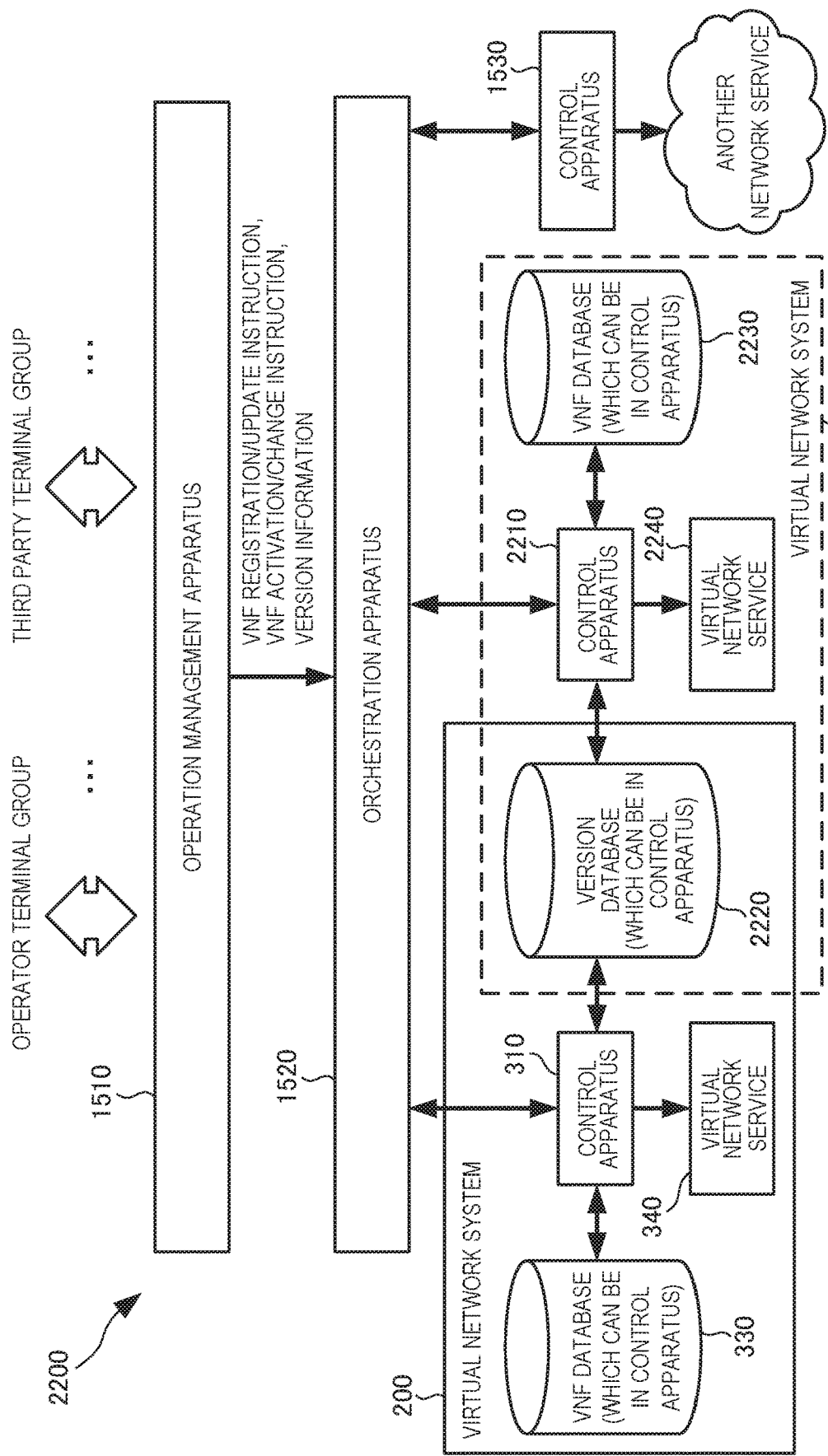

VIRTUAL NETWORK SYSTEM, VIRTUAL NETWORK CONTROL METHOD, VIRTUAL NETWORK FUNCTION DATABASE, ORCHESTRATION APPARATUS, CONTROL APPARATUS, AND CONTROL METHOD AND CONTROL PROGRAM OF CONTROL APPARATUS

CROSS REFERENCE TO RELATED APPLICATIONS

This application is a National Stage of International Application No. PCT/JP2016/050970 filed Jan. 14, 2016, claiming priority based on Japanese Patent Application No. 2015-019798 filed Feb. 3, 2015, the contents of all of which are incorporated herein by reference in their entirety.

TECHNICAL FIELD

The present invention relates to a virtual network system, a virtual network control method, a virtual network function database, an orchestration apparatus, a control apparatus, and a control method and control program of the control apparatus.

BACKGROUND ART

Along with popularization of SDN (Software-Defined Network) and the like, a technique of virtualizing a network has attracted increasing attention. Especially, a technique of virtualizing the functions of the network appliances of a carrier network, which is called NFV (Network Functions Virtualization), has been considered.

In the above technical field, patent literature 1 discloses a technique in which a virtualization apparatus creates a virtual appliance on a virtual machine for each dedicated appliance.

CITATION LIST

Patent Literature

Patent literature 1: Japanese Patent Laid-Open No. 2011-034403

SUMMARY OF THE INVENTION

Technical Problem

In the above-described NFV environment, it is predicted that a specific vender performs, for a carrier, so-called system integration in which products for a carrier network such as a router, switch, and gateway are developed and produced, and delivered by implementing software virtual appliances (=VNFs: Virtual Network Functions) on a general-purpose server.

It is hardly considered that a specific vender develops all virtual appliances forming a carrier network, and software of a third party may be delivered with respect to a specific function. If a VNF produced by a third party is to be incorporated in a system, a carrier operating a network needs to consider the validity (correctness) of the VNF produced by the third party.

However, the technique described in patent literature 1 is merely a technique of creating a virtual appliance on the virtual machine, and virtually providing the same service as that of the dedicated appliance, and does not assume that a third party different from a vender which creates the overall system joins. Therefore, in the technique described in patent literature 1, if an operator is to provide a virtual network service based on a virtual network function, it is impossible to select a virtual network function of an appropriate version, and thus prevent a malfunction of a virtual network.

The present invention enables to provide a technique of solving the above-described problem.

Solution to Problem

One aspect of the present invention provides a virtual network system comprising:

an instructor that instructs activation or change of a virtual network function preregistered and providing one of functions included in a virtual network service;

a confirmation unit that confirms that the virtual network function instructed to be activated or changed is appropriate, based on version information added at a time of registering the virtual network function; and a setting unit that sets, when said confirmation unit confirms that the virtual network function instructed to be activated or changed is appropriate, the instructed virtual network function as the one of the functions included in the virtual network service.

Another aspect of the present invention provides a virtual network control method comprising:

instructing activation or change of a virtual network function preregistered and providing one of functions included in a virtual network service;

confirming that the virtual network function instructed to be activated or changed is appropriate, based on version information added at a time of registering the virtual network function; and setting, when it is confirmed in said confirming step that the virtual network function instructed to be activated or changed is appropriate, the instructed virtual network function as the one of the functions included in the virtual network service.

Still other aspect of the present invention provides a control apparatus comprising:

a registration unit that registers a virtual network function and version information in association with each other, at a time of registering the virtual network function;

a confirmation unit that confirms that the virtual network function instructed to be activated or changed is appropriate, based on version information added at the time of registering the virtual network function; and a setting unit that sets, when said confirmation unit confirms that the virtual network function is appropriate, the instructed virtual network function as one of functions included in a virtual network service.

Still other aspect of the present invention provides a control method of a control apparatus, comprising:

registering a virtual network function and version information in association with each other, at the time of registering the virtual network function;

confirming, that the virtual network function instructed to be activated or changed is appropriate, based on version information added at the time of registering the virtual network function; and setting, when it is confirmed in said confirming step that the virtual network function is appropriate, the instructed virtual network function as one of functions included in a virtual network service.

Still other aspect of the present invention provides a control program of a control apparatus for causing a computer to execute a method, comprising:

registering a virtual network function and version information in association with each other in a registration unit, at a time of registering virtual network function;

confirming that the virtual network function instructed to be activated or changed is appropriate, based on version information added at the time of registering the virtual network function; and setting, when it is confirmed in said confirming step that the virtual network function is appropriate, the instructed virtual network function as one of functions included in a virtual network service.

Still other aspect of the present invention provides a virtual network function database for registering a virtual network function, version information of the virtual network function, and compatibility information of a version of the virtual network function in association with each other, at a time of registering the virtual network function.

Still other aspect of the present invention provides an orchestration apparatus comprising:

an interface connected to a plurality of virtual network services, and to an operator terminal and a third party terminal via an operation management apparatus that manages an operation of a virtual network system;

a transmitter that, in accordance with an instruction of registration or update of a virtual network function providing a virtual network service from the third party terminal, selects a target virtual network service from the plurality of virtual network services and transmits at least the virtual network function to be registered and version information of the virtual network function to be registered, and, in accordance with an instruction of activation or change of a virtual network function from the operator terminal, selects a target virtual network service from the plurality of virtual network services and transmits at least version information of the virtual network function to be activated or changed; and a notifier that acquires a confirmation result of a version of the virtual network function from the target virtual network service, and notifies the operator terminal or the third party terminal of the confirmation result.

Advantageous Effects of Invention

According to the present invention, if an operator is to provide a virtual network service based on a virtual network function, it is possible to select a virtual network function of an appropriate version, and thus prevent a malfunction of a virtual network.

BRIEF DESCRIPTION OF DRAWINGS

FIG. 3D is a view showing still other service chain of the virtual network service according to the second example embodiment of the present invention;

FIG. 4 is a sequence chart showing the operation procedure of the virtual network system according to the second example embodiment of the present invention;

FIG. 5C is a view showing the structure of a management database according to the second example embodiment of the present invention;

FIG. 6A is a block diagram showing the functional arrangement of an operation management apparatus according to the second example embodiment of the present invention;

FIG. 7B is a table showing another structure of the version data according to the second example embodiment of the present invention;

FIG. 7D is a view showing still other structures of the version data and VNF data according to the second example embodiment of the present invention;

FIG. 7F is a view showing still other structure of the VNF data according to the second example embodiment of the present invention;

FIG. 13B is a table showing the structure of a registrability/updatability determination table according to the third example embodiment of the present invention;

FIG. 22 is a block diagram showing another arrangement of the virtual network system according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A virtual network system 100 according to the first example embodiment of the present invention will be described with reference to FIG. 1. The virtual network system 100 is a system that manages a virtual network.

Figure 1:
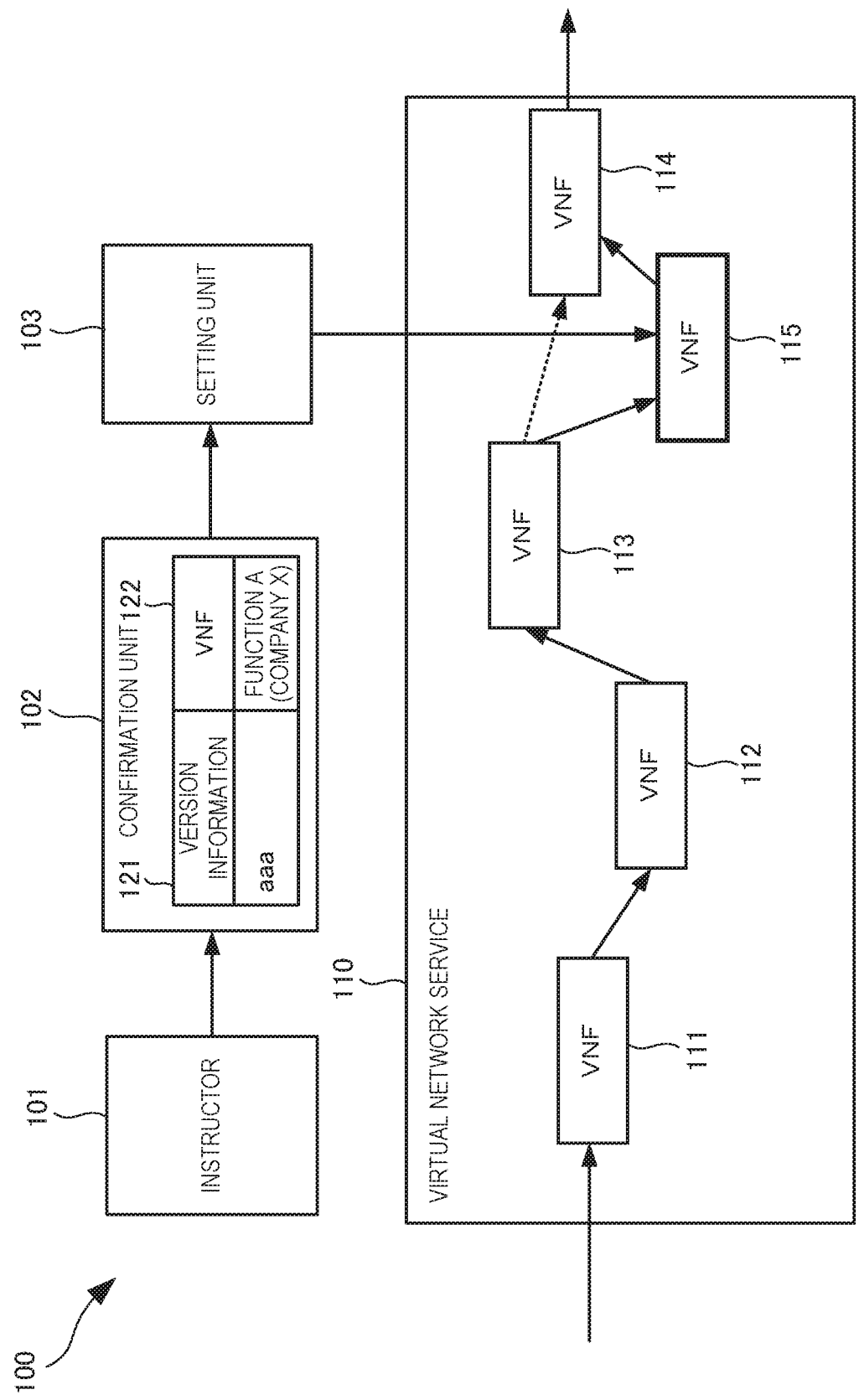
FIG. 1 is a block diagram showing the arrangement of a virtual network system according to the first example embodiment of the present invention.

As shown in FIG. 1, the virtual network system 100 includes an instructor 101, a confirmation unit 102, and a setting unit 103. The instructor 101 instructs to activate or change virtual network functions 111 to 115 that provide a virtual network service 110. Based on version information 121 added at the time of registration of a virtual network function 122, the confirmation unit 102 confirms whether the virtual network function 122 instructed to be activated or changed is appropriate. If the confirmation unit 102 confirms that the virtual network function 122 is appropriate, the setting unit 103 sets the instructed virtual network function 115 as the virtual network service 110.

According to this example embodiment, if an operator is to create a virtual network service based on a virtual network function, the version of the virtual network function instructed to be activated or changed is confirmed, and it is thus possible to prevent a malfunction of a virtual network.

Second Example Embodiment

A virtual network system according to the second example embodiment of the present invention will be described next. In the virtual network system according to this example embodiment, when an operator terminal instructs to activate or change an already registered virtual network function, it is confirmed that the target virtual network function is of an appropriate version. Activation of the virtual network function is to newly activate the already registered virtual network function as a target virtual network service. Change of the virtual network function is to replace the virtual network function used for a target virtual network service.

In this example embodiment, the virtual network service may be defined for, for example, each operator who uses the network system or each service provided by the operator to the user.

Note that as virtual network functions (VNFs), GW (gateway), FW (firewall), LB (Load Balancer), DPI (Deep Packet Inspection), and the like are known, and every function that creates a virtual network may be included. Furthermore, the VNF may be defined for each dedicated appliance such as GW or FW in a general network, or defined for each function of each dedicated appliance. In addition, each apparatus according to this example embodiment may be integrated into one hardware component, or implemented by software components for executing respective functions. In this case, each apparatus need not indicate the boundary as hardware.

<<Virtual Network System>>

The virtual network system according to this example embodiment will be described in detail below with reference to FIGS. 2 to 4.

Figure 2:
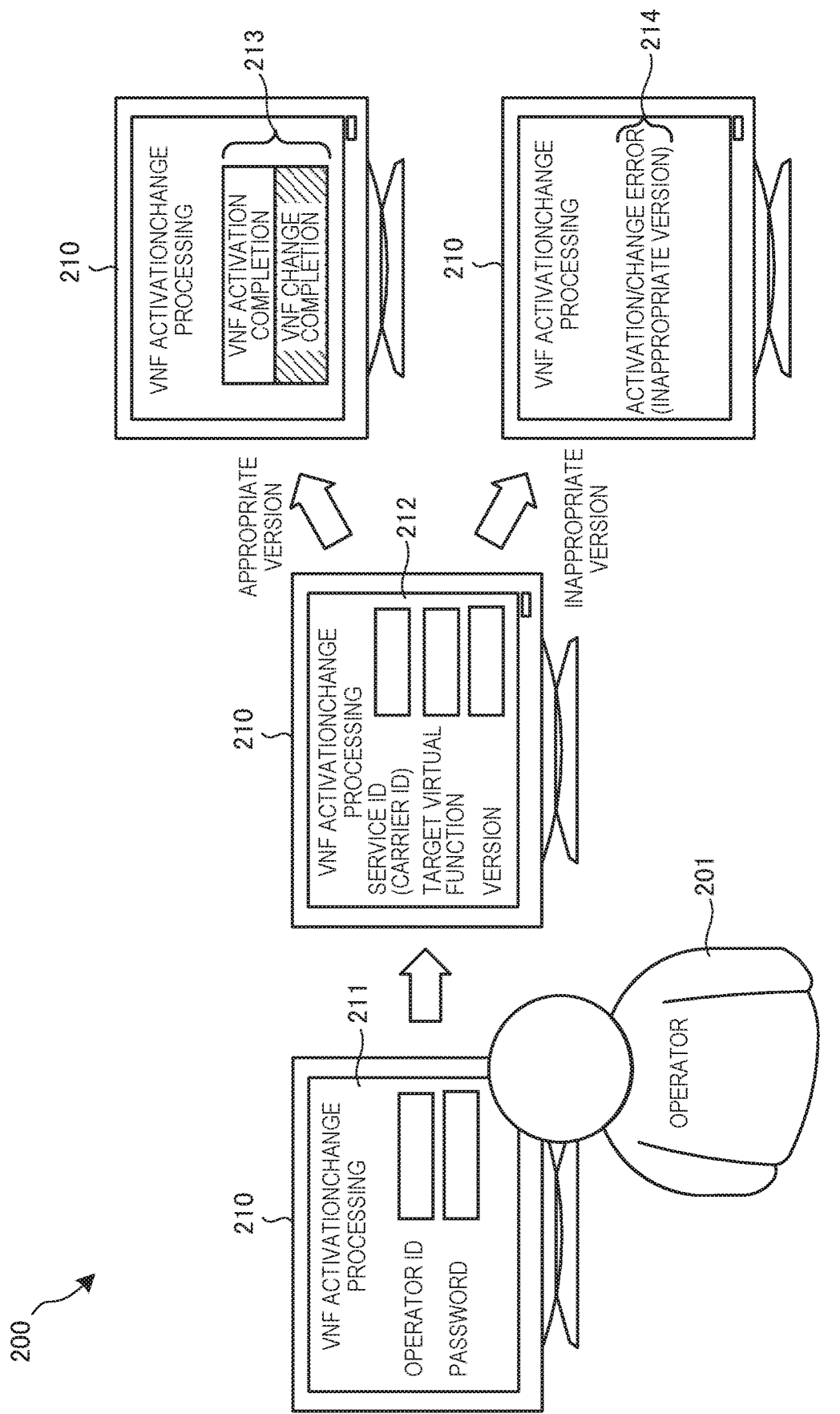
FIG. 2 is a view showing an outline of the operation of a virtual network system according to the second example embodiment of the present invention.

(Outline of Operation) FIG. 2 is a view showing an outline of the operation of a virtual network system 200 according to this example embodiment. FIG. 2 shows display examples of an operator terminal 210 operated by an operator 201 who instructs to activate or change a virtual network function during the operation according to this example embodiment.

A display screen 211 is a screen for authenticating whether the operator 201 has authority to operate the virtual network system 200 of this example embodiment. The operator 201 is authenticated by inputting an operator ID and a password.

If the operator 201 is authenticated, he/she inputs, to a display screen 212, a service ID (or carrier ID) as a target of VNF activation or change, a function (VNF) to be activated or changed, and the version of the VNF. Note that the version of the VNF may be selected from the display, instead of inputting the version by the operator 201.

According to this example embodiment, whether the target VNF may be activated or changed in the target virtual network service, that is, whether the version of the target VNF is an appropriate one is confirmed. In this example embodiment, the version is confirmed by comparing the version of the VNF to be read out from a virtual network function database (to be referred to as a VNF database hereinafter) with an appropriate version held in a version database.

If it is confirmed that the version is appropriate, the VNF read out from the VNF database is set in the target virtual network, and information indicating the VNF activation completion or VNF change completion is displayed on a display screen 213 of the operator terminal 210. On the other hand, if it is confirmed that the version is not appropriate, it is determined that the version is inappropriate and a malfunction of the virtual network may occur. As a result, the VNF activation or change processing is terminated, and information indicating that an activation or change error has occurred and its factor is the invalid version is displayed on a display screen 214 of the operator terminal 210.

(System Arrangement)

Figure 3A:
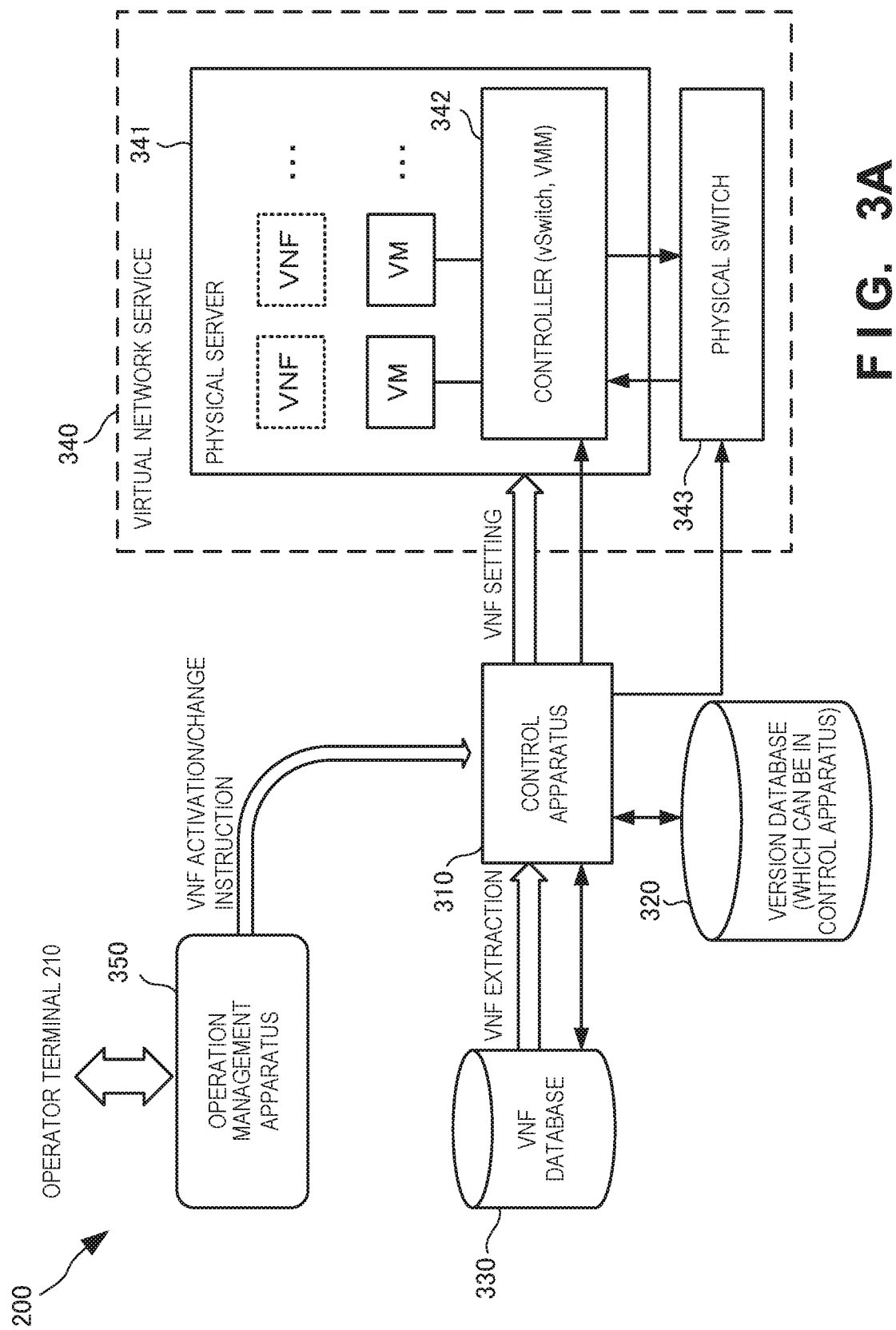
FIG. 3A is a block diagram showing the arrangement of the virtual network system according to the second example embodiment of the present invention.

FIG. 3A is a block diagram showing the arrangement of the virtual network system 200 according to this example embodiment. Note that in the virtual network system 200, an arrangement related to VNF activation or change processing is shown, and no arrangement related to VNF registration or update processing is shown by assuming that the VNF is already registered in the VNF database.

In the virtual network system 200, a control apparatus 310 controls version confirmation in the VNF activation or change processing according to this example embodiment, and VNF setting based on the result. A version database 320 holds appropriate version information in the VNF activation or change processing according to this example embodiment. Note that the version database 320 may be provided in the control apparatus 310. A VNF database 330 stores a pre-registered VNF and its version information to be searchable by provider information, a VNF identifier, or the like. A search key is not limited to the provider information or VNF identifier, and is variously selected in consideration of prevention of unauthorized registration, alteration, or occurrence of erroneous registration of the VNF. The control apparatus 310, the version database 320, and the VNF database 330 function as the confirmation unit 102 and the setting unit 103 in FIG. 1.

A virtual network service 340 is a network service that is provided by connecting a plurality of VNFs to the virtual network system 200 according to this example embodiment. Note that the number of virtual network services 340 is not limited to one, and a plurality of different network services may be provided. The virtual network service 340 includes a physical server 341 that executes a VNF in a virtual machine (VM), and a physical switch 343 that switches packet transfer with the physical server 341. The physical server 341 includes a plurality of VMs that execute various processes, and a controller 342 that implements the virtual network service 340 by setting a plurality of VNFs in accordance with a route. As the controller 342, "Open vSwitch", "VMM (Virtual Machine Manager)", or the like is used, and a detailed description thereof will be omitted.

An operation management apparatus 350 is connected to the operator terminal 210, and transmits a VNF activation or change instruction to the control apparatus 310. The operation management apparatus 350 or the operation management apparatus 350 and operator terminal 210 function as the instructor 101 of FIG. 1.

In the arrangement of FIG. 3A, the VNF database 330 stores a VNF and its version information to be searchable, and the version database 320 holds an appropriate version of each VNF. If the operator authenticated by the system instructs to activate or change the VNF stored in the VNF database 330 from the operator terminal 210, the operation management apparatus 350 sends a VNF activation or change instruction to the control apparatus 310. The VNF activation or change instruction is added with an identifier (for example, ID: 123, ID: abc, or the like) for identifying the VNF and version information.

The identifier for identifying the VNF is desirably converted, in the operator terminal 210 or the operation management apparatus 350, from a function name (for example, firewall or the like) input or selected by the operator. That is, the operator inputs or selects, from the operator terminal 210, a name from which the operator can readily grasp the function, such as a firewall, load balancer, or DPI (Deep Packet Inspection). Then, in the operator terminal 210 or the operation management apparatus 350, the input or selected name is desirably converted into an identifier (for example, ID: 123, ID: abc, or the like) for identifying the VNF.

Upon receiving the VNF activation or change instruction, the control apparatus 310 searches for the target VNF from the VNF database 330, and reads out corresponding appropriate version information from the version database 320. The control apparatus 310 then confirms whether the version is appropriate. Note that in this example embodiment, the control apparatus 310 performs comparison of versions and the like. However, the version database 320 may perform processing such as version confirmation, and return the result to the control apparatus 310.

If version confirmation is OK, the control apparatus 310 implements VNF activation or change by instructing the controller 342 of the physical server 341 to set the VNF found from the VNF database 330. Note that the route of the activated or changed VNF in the controller 342 may be input by the operator from the operator terminal 210 or automatically set by the operation management apparatus 350 or the control apparatus 310.

On the other hand, if version confirmation is not OK, the control apparatus 310 terminates the VNF activation or change processing, and the operator terminal 210 notifies the operator of a VNF activation or change error.

(Service Chain Examples)

Examples of the service chain of the virtual network service 340 will be described below with reference to FIGS. 3B to 3D. Note that the service chain is not limited to examples of FIGS. 3B to 3D, and a combination of components of FIGS. 3B to 3D may be used.

Figure 3B:
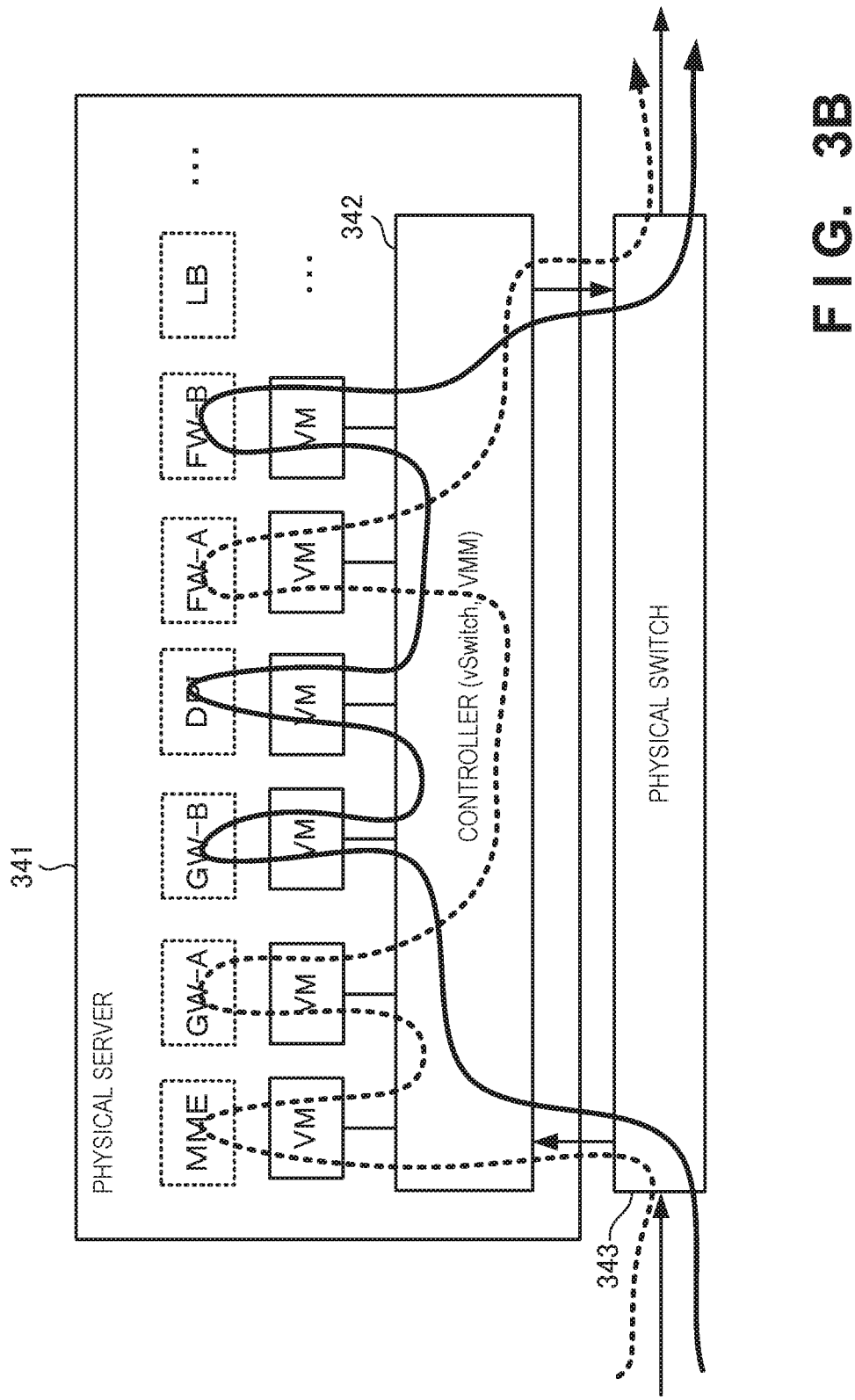
FIG. 3B is a view showing a service chain of a virtual network service according to the second example embodiment of the present invention.

FIG. 3B is a view showing service chains of the virtual network service 340 according to this example embodiment. Referring to FIG. 3B, in the one physical server 341, VNFs are executed by VMs. Note that examples of VNFs providable by the physical server 341 are MME (Mobility Management Entity), different GW-A and GW-B, DPI, different FW-A and FW-B, and LB. FIG. 3B shows two different service chains (a solid line and a broken line). These service chains may be services for individual users or carriers.

In the service chain indicated by the solid line, based on VNF information and path control information set in the controller 342 by the control apparatus 310, GW-B, DPI, and FW-B are sequentially executed by the VMs managed by the controller 342 for a packet transferred from the physical switch 343 to the physical server 341. A packet as an execution result is returned from the physical server 341 to the physical switch 343, thereby providing the virtual network service 340.

In the service chain indicated by the broken line, based on the VNF information and path control information set in the controller 342 by the control apparatus 310, MME, GW-A, and FW-A are sequentially executed by the VMs managed by the controller 342 for a packet transferred from the physical switch 343 to the physical server 341. A packet as an execution result is returned from the physical server 341 to the physical switch 343, thereby providing the virtual network service 340.

In this example embodiment, if authentication by the control apparatus 310 is valid, the control apparatus 310 sends a VNF activation or change instruction to the controller 342, and makes settings.

Figure 3C:
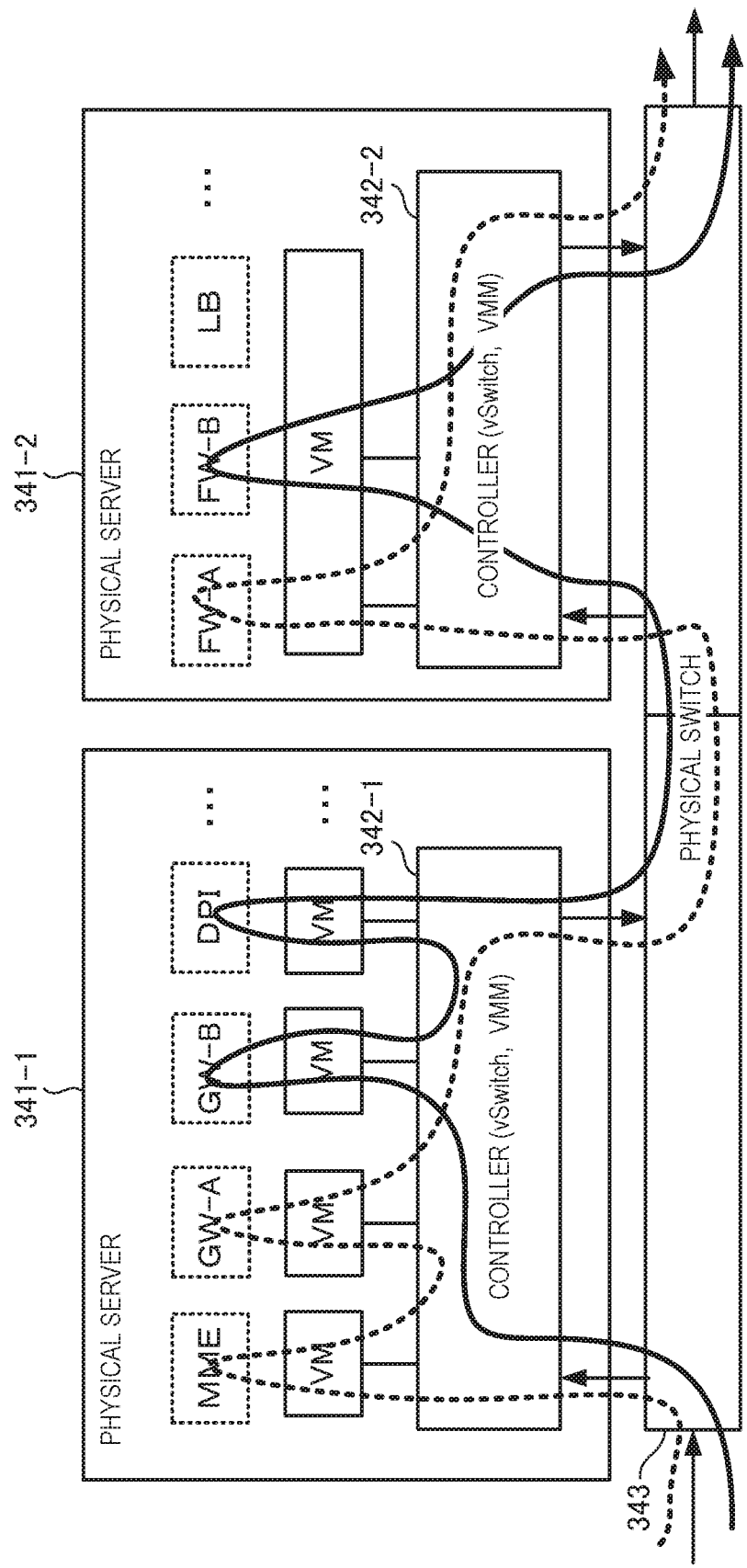
FIG. 3C is a view showing another service chain of the virtual network service according to the second example embodiment of the present invention.

FIG. 3C is a view showing other service chains of the virtual network service 340 according to this example embodiment. Referring to FIG. 3C, in a plurality of physical servers 341-1 and 341-2, VNFs are executed by VMs. Note that examples of VNFs providable by the physical server 341-1 are MME, different GW-A and GW-B, and DPI. Examples of VNFs providable by the physical server 341-2 are different FW-A and FW-B and LB. FIG. 3C shows two different service chains (a solid line and a broken line). These service chains may be services for individual users or carriers.

In the service chain indicated by the solid line, based on VNF information and path control information set in a controller 342-1 by the control apparatus 310, GW-B and DPI are sequentially executed by the VMs managed by the controller 342-1 for a packet transferred from the physical switch 343 to the physical server 341-1. A packet as an execution result is returned from the physical server 341-1 to the physical switch 343. Next, based on VNF information and path control information set in a controller 342-2 by the control apparatus 310, FW-B is executed by the VM managed by the controller 342-2 for a packet transferred from the physical switch 343 to the physical server 341-2. A packet as an execution result is returned from the physical server 341-2 to the physical switch 343, thereby providing the virtual network service 340.

In the service chain indicated by the broken line, based on the VNF information and path control information set in the controller 342-1 by the control apparatus 310, MME and GW-A are sequentially executed by the VMs managed by the controller 342-1 for a packet transferred from the physical switch 343 to the physical server 341-1. A packet as an execution result is returned from the physical server 341-2 to the physical switch 343. Based on the VNF information and path control information set in the controller 342-2 by the control apparatus 310, FW-A is executed by the VM managed by the controller 342-2 for a packet transferred from the physical switch 343 to the physical server 341-2. A packet as an execution result is returned from the physical server 341-2 to the physical switch 343, thereby providing the virtual network service 340.

In this example embodiment, if authentication by the control apparatus 310 is valid, the control apparatus 310 sends a VNF activation or change instruction to the controller 342, and makes settings.

FIG. 3D is a view showing still other service chains of the virtual network service 340 according to this example embodiment. Referring to FIG. 3D, in each of a plurality of physical servers 341-3 to 341-6, each VNF is executed by a VM. Note that an example of a VNF providable by the physical server 341-3 is MME, an example of a VNF providable by the physical server 341-4 is GW, an example of a VNF providable by the physical server 341-5 is DPI, and an example of a VNF providable by the physical server 341-6 is FW. FIG. 3D shows two different service chains (a solid line and a broken line). These service chains may be services for individual users or carriers.

In the service chain indicated by the solid line, GW set in a controller 342-4 by the control apparatus 310 is executed by the VM managed by the controller 342-4 for a packet transferred from the physical switch 343 to the physical server 341-4. A packet as an execution result is returned from the physical server 341-4 to the physical switch 343. Next, DPI set in a controller 342-5 by the control apparatus 310 is executed by the VM managed by the controller 342-5 for a packet transferred from the physical switch 343 to the physical server 341-5. A packet as an execution result is returned from the physical server 341-5 to the physical switch 343. Then, FW set in a controller 342-6 by the control apparatus 310 is executed by the VM managed by the controller 342-6 for a packet transferred from the physical switch 343 to the physical server 341-6. A packet as an execution result is returned from the physical server 341-6 to the physical switch 343, thereby providing the virtual network service 340.

In the service chain indicated by the broken line, MME set in a controller 342-3 by the control apparatus 310 is executed by the VM managed by the controller 342-3 for a packet transferred from the physical switch 343 to the physical server 341-3. A packet as an execution result is returned from the physical server 341-3 to the physical switch 343. Next, GW set in a controller 342-4 by the control apparatus 310 is executed by the VM managed by the controller 342-4 for a packet transferred from the physical switch 343 to the physical server 341-4. A packet as an execution result is returned from the physical server 341-4 to the physical switch 343. Then, FW set in a controller 342-6 by the control apparatus 310 is executed by the VM managed by the controller 342-6 for a packet transferred from the physical switch 343 to the physical server 341-6. A packet as an execution result is returned from the physical server 341-6 to the physical switch 343, thereby providing the virtual network service 340.

In this example embodiment, if authentication by the control apparatus 310 is valid, the control apparatus 310 sends a VNF activation or change instruction to the controllers 342-3 to 342-6, and makes settings.

(Operation Procedure)

FIG. 4 is a sequence chart showing the operation procedure of the virtual network system 200 according to this example embodiment. In the sequence of FIG. 4, the control apparatus 310 determines whether version information is appropriate or inappropriate.

In step S401, operator authentication processing is performed between the operator terminal 210 and the operation management apparatus 350. If operator authentication is OK, the operator terminal 210 instructs, in step S403, the operation management apparatus 350 to activate or change a desired VNF of a target virtual network service.

In step S409, the operation management apparatus 350 instructs the control apparatus 310 to activate or change the target VNF. This VNF activation or change instruction includes the version information of the VNF. If the operator performs route setting, this VNF activation or change instruction may also include networking information indicating the route of the VNF. The instruction to activate or change the target VNF is also transmitted from the control apparatus 310 to the version database 320 and the VNF database 330.

In step S411, the version database 320 extracts appropriate version information corresponding to the target VNF, and transmits it to the control apparatus 310. In step S413, the control apparatus 310 acquires the appropriate version information. Then, in step S415, using the acquired appropriate version information, the control apparatus 310 determines whether the version is valid or invalid.

If it is determined that the version of the VNF is valid, the VNF database 330 extracts, in step S417, the VNF data and version information of the target VNF, and transmits them to the control apparatus 310. In step S419, the control apparatus 310 acquires the VNF data and version information. In step S421, the control apparatus 310 sets the acquired VNF in the controller 342 of the physical server 341, and notifies the operator terminal 210 of activation or change completion of the VNF. In step S423, the controller 342 of the physical server 341 executes activation or change processing of the set VNF. In step S425, the operator terminal 210 displays, on the screen, information indicating that the activation or change processing of the VNF by the operator is complete, thereby notifying the operator of it. On the other hand, if it is determined that the version of the VNF is invalid, the control apparatus 310 notifies, in step S427, the operator terminal 210 of an error by determining that the version of the VNF to be activated or changed is inappropriate, and terminating the activation or change processing. In step S429, the operator terminal 210 displays a VNF activation or change error on the screen, thereby notifying the operator of it.

<<Functional Arrangement of Control Apparatus>>

Figure 5A:
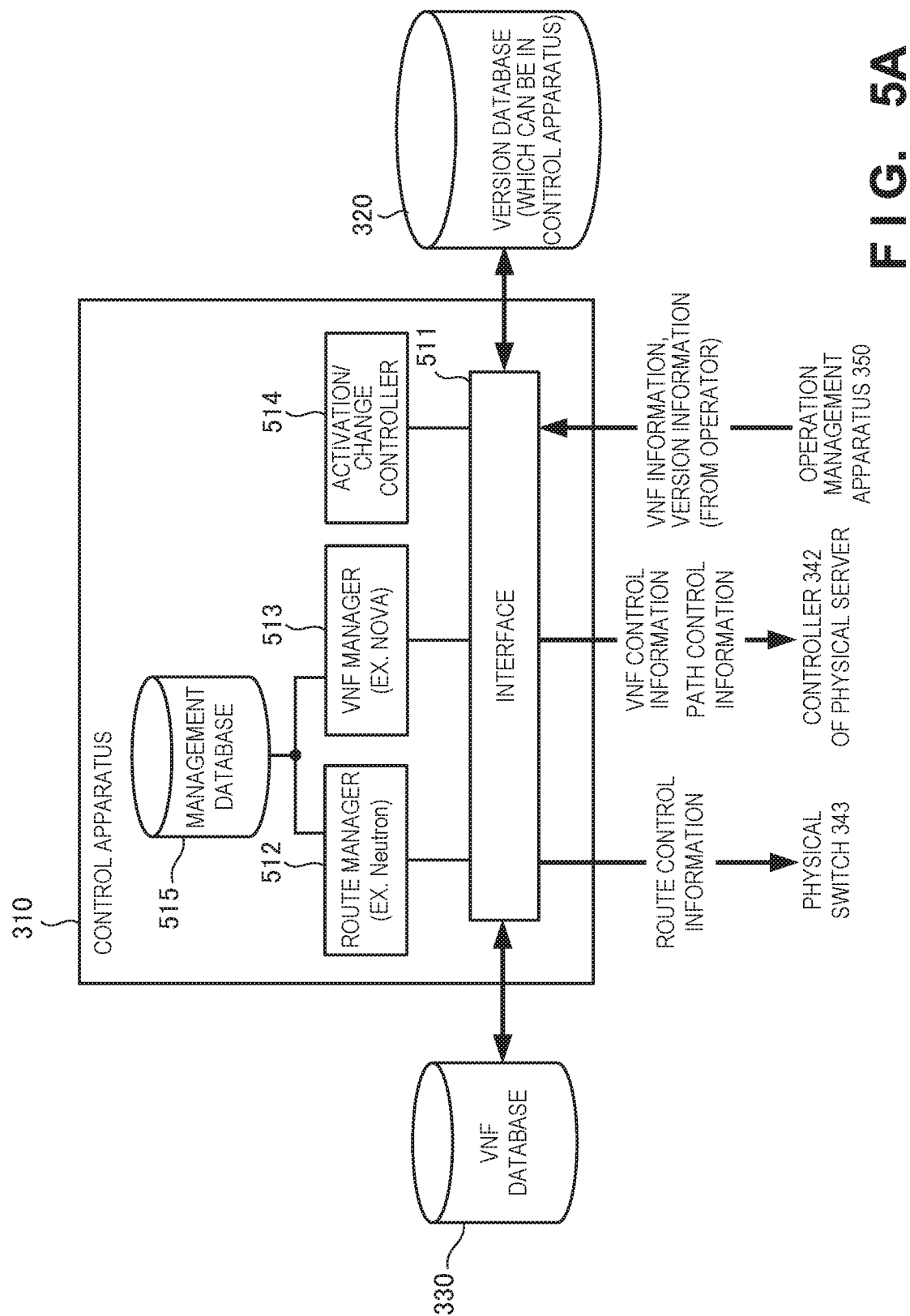
FIG. 5A is a block diagram showing the functional arrangement of a control apparatus according to the second example embodiment of the present invention.

FIG. 5A is a block diagram showing the functional arrangement of the control apparatus 310 according to this example embodiment.

The control apparatus 310 includes an interface 511, a route manager 512, a VNF manager 513, an activation/change controller 514, and a management database 515. Note that the management database 515 may be provided outside the control apparatus 310.

The interface 511 communicates with other components forming the virtual network system 200. In this example embodiment, the interface 511 is connected to the version database 320 to communicate the version information, and communicates with the VNF database 330 to communicate the VNF. Furthermore, the interface 511 receives a VNF activation or change instruction including VNF information from the operator terminal 210 via the operation management apparatus 350. The interface 511 is connected to the controller 342 of the physical server 341 to transmit VNF control information and path information. The interface 511 is also connected to the physical switch 343 to transmit route control information.

The route manager 512 performs route control for the controller 342 of the physical server 341 via the interface 511. For example, if the version confirmation result is appropriate, the route manager 512 instructs the controller 342 of the physical server 341 to perform route setting corresponding to the acquired VNF. For example, Neutron or the like that controls a virtual network via a virtual hypervisor in OpenStack is used as the route manager 512. Note that the route manager 512 may instruct the physical switch 343 outside the physical server 341 to perform route setting, in accordance with route management information. With reference to VNF management information of the operation management apparatus 350, the VNF manager 513 performs VM control for the controller 342 of the physical server 341 via the interface 511. For example, if the version confirmation result is appropriate, the VNF manager 513 instructs the controller 342 of the physical server 341 to set a VM corresponding to the acquired VNF. Setting of the VM includes, for example, activation, change, and deletion of the VM. For example, NOVA Compute or the like that controls the operation of the virtual machine (VM) via the virtual hypervisor in OpenStack is used as the VNF manager 513.

In response to the VNF activation or change instruction, the activation/change controller 514 controls activation or change of the VNF based on the result of determining, by version confirmation, whether the VNF is appropriate or inappropriate. The management database 515 stores information for managing the controller 342 of the physical server 341 and the physical switch 343 by the route manager 512 and the VNF manager 513.

<<Controller of Physical Server>>

Figure 5B:
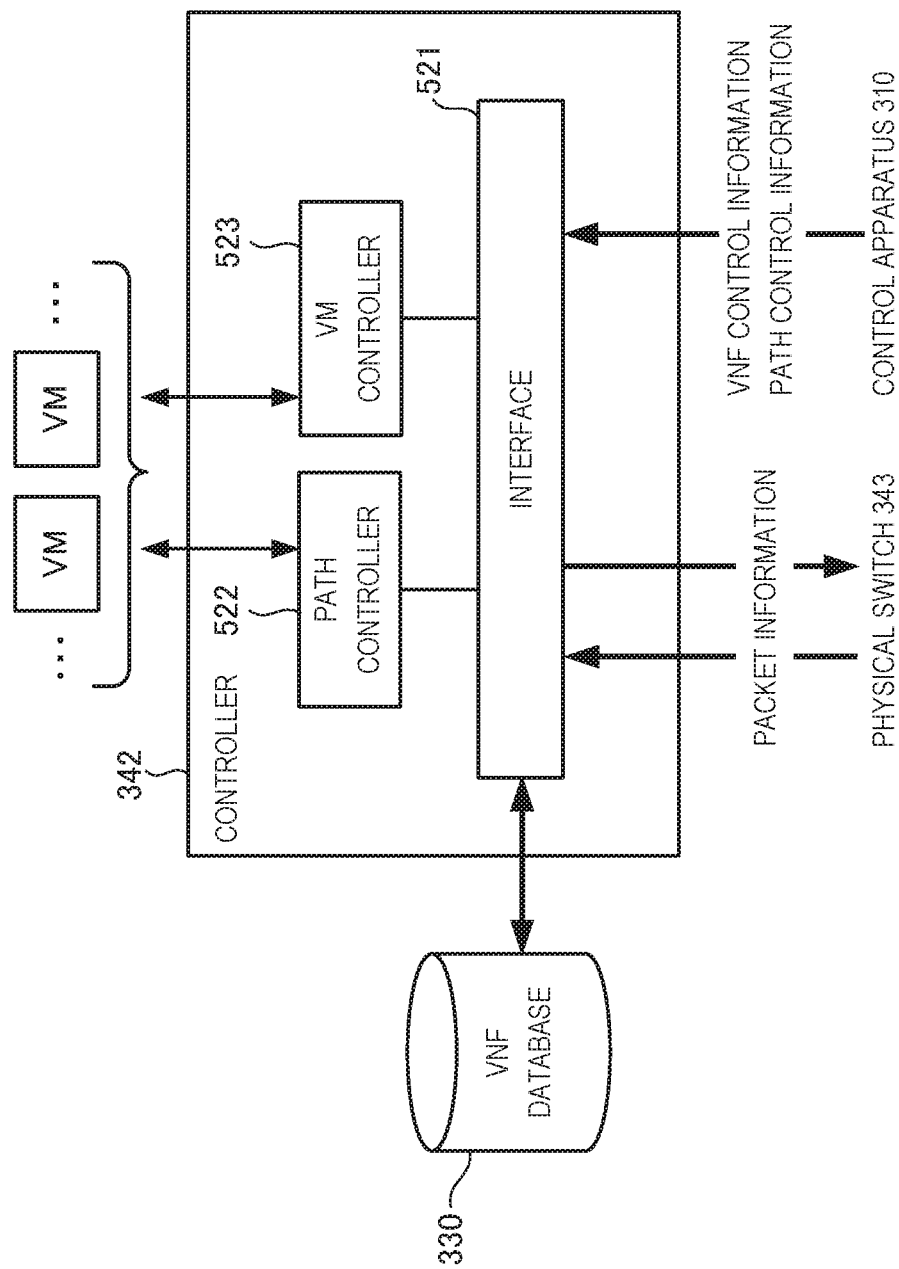
FIG. 5B is a block diagram showing the functional arrangement of a controller that controls a physical server according to the second example embodiment of the present invention.

FIG. 5B is a block diagram showing the functional arrangement of the controller 342 that controls the physical server 341 according to this example embodiment.

The controller 342 includes an interface 521, a path controller 522, and a VM controller 523.

The interface 521 communicates with other components forming the virtual network system 200. In this example embodiment, the interface 521 is connected to the control apparatus 310 to receive VNF control information and path control information. The interface 521 is also connected to the physical switch 343 to transmit/receive packet information. In addition, the interface 521 receives an authenticated VNF from the VNF database 330.

Based on the path control information received from the control apparatus 310, the path controller 522 controls paths in which VMs execute VNFs. Based on the VNF control information received from the control apparatus 310, the VM controller 523 controls the VNFs and the VMs that execute the VNFs.

Note that a VNF to be activated or changed may be directly installed from the VNF database 330 or installed via the control apparatus 310.

(Management Database)

FIG. 5C is a view showing the structure of the management database 515 according to this example embodiment. The management database 515 is used by the route manager 512 and the VNF manager 513 to manage the controller 342 of the physical server 341 and the physical switch 343. Note that the structure of the management database 515 is not limited to that shown in FIG. 5C.

The management database 515 includes a management table 530 for managing the controller 342 of the physical server 341, and a management table 540 for managing the physical switch 343.

The management table 530 stores an identification condition 531 for identifying a virtual network service, and VNF control information and path control information 532 corresponding to the identification condition 531. The identification condition 531 includes, for example, a carrier ID for identifying a carrier, and a packet header for identifying a packet. The VNF control information and path control information 532 include VNFs and their path order (route).

The management table 540 stores an identification condition 541 for identifying a virtual network service, and route control information 542 corresponding to the identification condition 541. The identification condition 541 includes, for example, a carrier ID for identifying a carrier, and a packet header for identifying a packet. The route control information 542 includes a physical server and its route.

<<Functional Arrangement of Operation Management Apparatus>>

FIG. 6A is a block diagram showing the functional arrangement of the operation management apparatus 350 according to this example embodiment.

The operation management apparatus 350 includes an interface 611, an operator manager 612, and a VNF manager 613.

The interface 611 communicates with other components forming the virtual network system 200. In this example embodiment, the interface 611 is connected to the operator terminal 210 to receive a VNF activation or change instruction input by the operator, VNF information, and operator authentication information, and to transmit the VNF activation or change result to the operator terminal 210. The interface 611 is connected to the control apparatus 310 to transmit a VNF activation or change request and receive a VNF activation or change result corresponding to a version confirmation result from the control apparatus 310.

The operator manager 612 registers an operator, and performs authentication processing of approving access by the operator from the operator terminal 210. The VNF manager 613 includes a management table 630 for managing VNFs, and manages the current VNF registration state based on VNF information from the operator terminal 210, VNF control information of VNF activation/change by the control apparatus 310, or the like.

(Management Table)

Figure 6B:
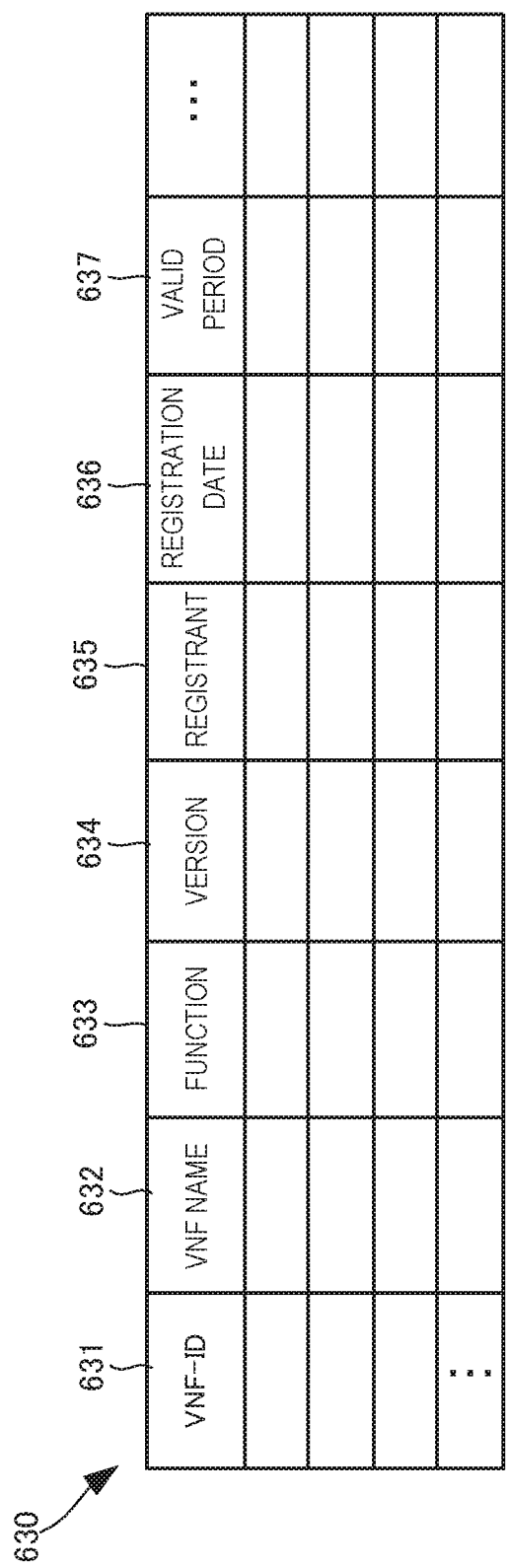
FIG. 6B is a table showing the structure of a management table according to the second example embodiment of the present invention.

FIG. 6B is a table showing the structure of the management table 630 according to this example embodiment. The management table 630 is used for an operation associated with a VNF from the operator terminal 210. Note that the structure of the management table 630 is not limited to that shown in FIG. 6B.

The management table 630 stores a VNF name 632, a VNF function 633, a version 634, a registrant 635, a registration date 636, a valid period 637, and the like in association with a VNF-ID 631 as a VNF identifier.

<<Authentication Data and VNF Data>>

Various structures of the version data and the VNF data held in the VNF database according to this example embodiment will be described below with reference to FIGS. 7A to 7F. However, the structures of the version data and VNF data are not limited to them. To prevent occurrence of a malfunction caused by an inappropriate version of the virtual network function, it is possible to add other information to the virtual network function. Note that authentication may be performed by combining FIGS. 7A to 7F.

(Confirmation of Latest Version)

Figure 7A:
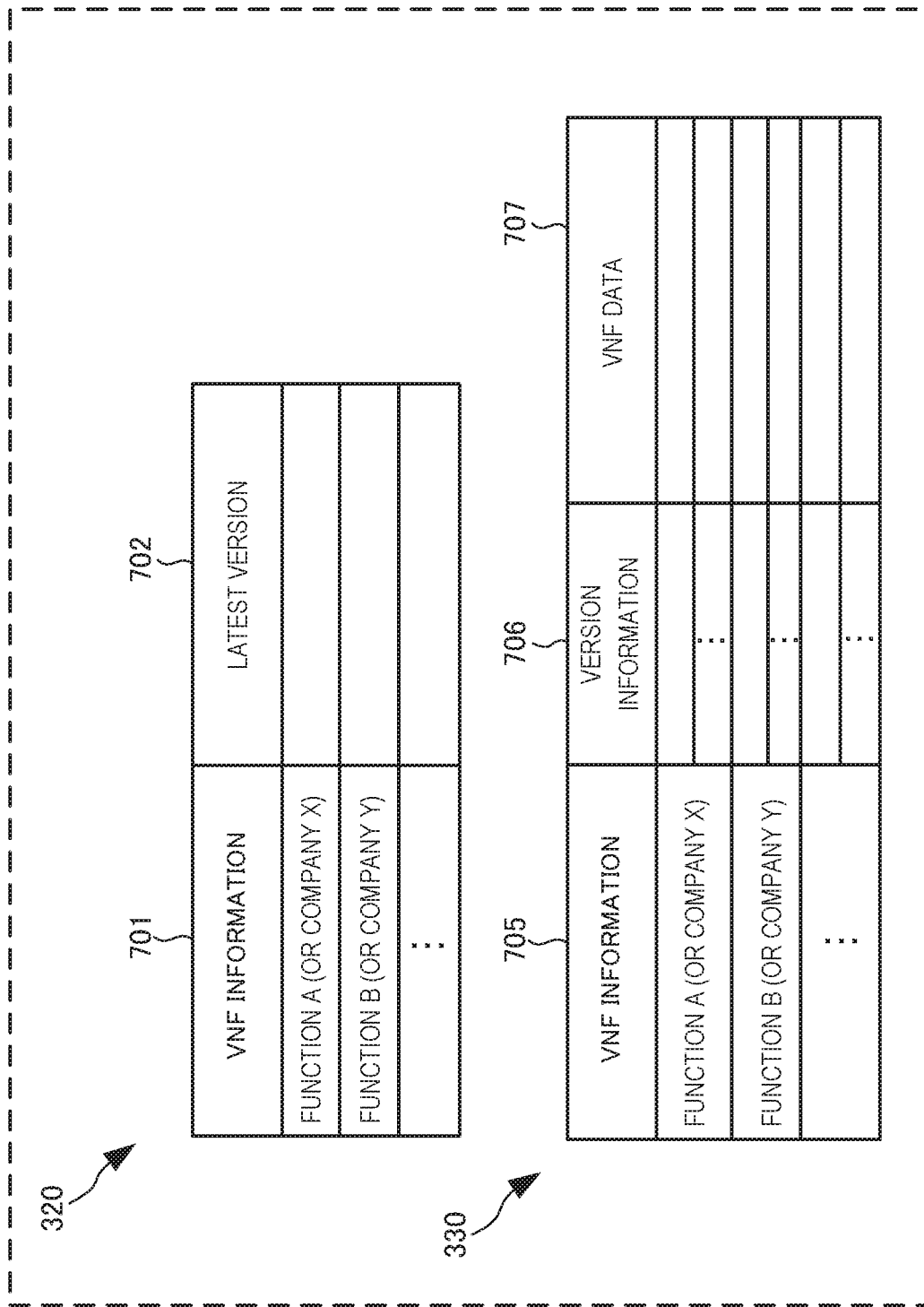
FIG. 7A is a view showing the structures of version data and VNF data according to the second example embodiment of the present invention.

FIG. 7A is a view showing the structures of the version data and VNF data according to this example embodiment. FIG. 7A shows the structure of the version data held in the version database 320 and that of the VNF data stored in the VNF database 330 when provision of one function is simply contracted for one VNF provider (third party).

The version database 320 stores a latest version 702 in association with each VNF 701. Note that each VNF 701 may be function information (function A or function B in FIG. 7A) input by the operator or provider information (company X or company Y in FIG. 7A) input by a VNF provider.

The VNF database 330 stores version information 706 and VNF data 707 in association with each VNF 705. Note that each VNF 705 may be function information (function A or function B in FIG. 7A) input by the operator or provider information (company X or company Y in FIG. 7A) input by a VNF provider.

In FIG. 7A, in association with the provider function or VNF provider, it is confirmed whether the version is the latest one.

(Compatibility of Version of VNF)

FIG. 7B is a table showing other structures of the version data and VNF data according to this example embodiment. FIG. 7B shows the structure of the version data held in the version database 320 and including compatibility information for confirming whether the version of the VNF is compatible.

The version database 320 stores a currently used VNF 712, an activatable or changeable VNF 713, and an unactivatable or unchangeable VNF 714 in association with a virtual network service ID 711 as a VNF activation or change target. Each of the currently used VNF 712, the activatable or changeable VNF 713, and the unactivatable or unchangeable VNF 714 includes the function of the VNF, a VNF provider, and version information.

In FIG. 7B, it is confirmed whether the version of the VNF to be activated or changed is compatible with the version of the VNF currently used in the virtual network.

(Version Confirmation when Plural Providers Provide Same VNF)

Figure 7C:
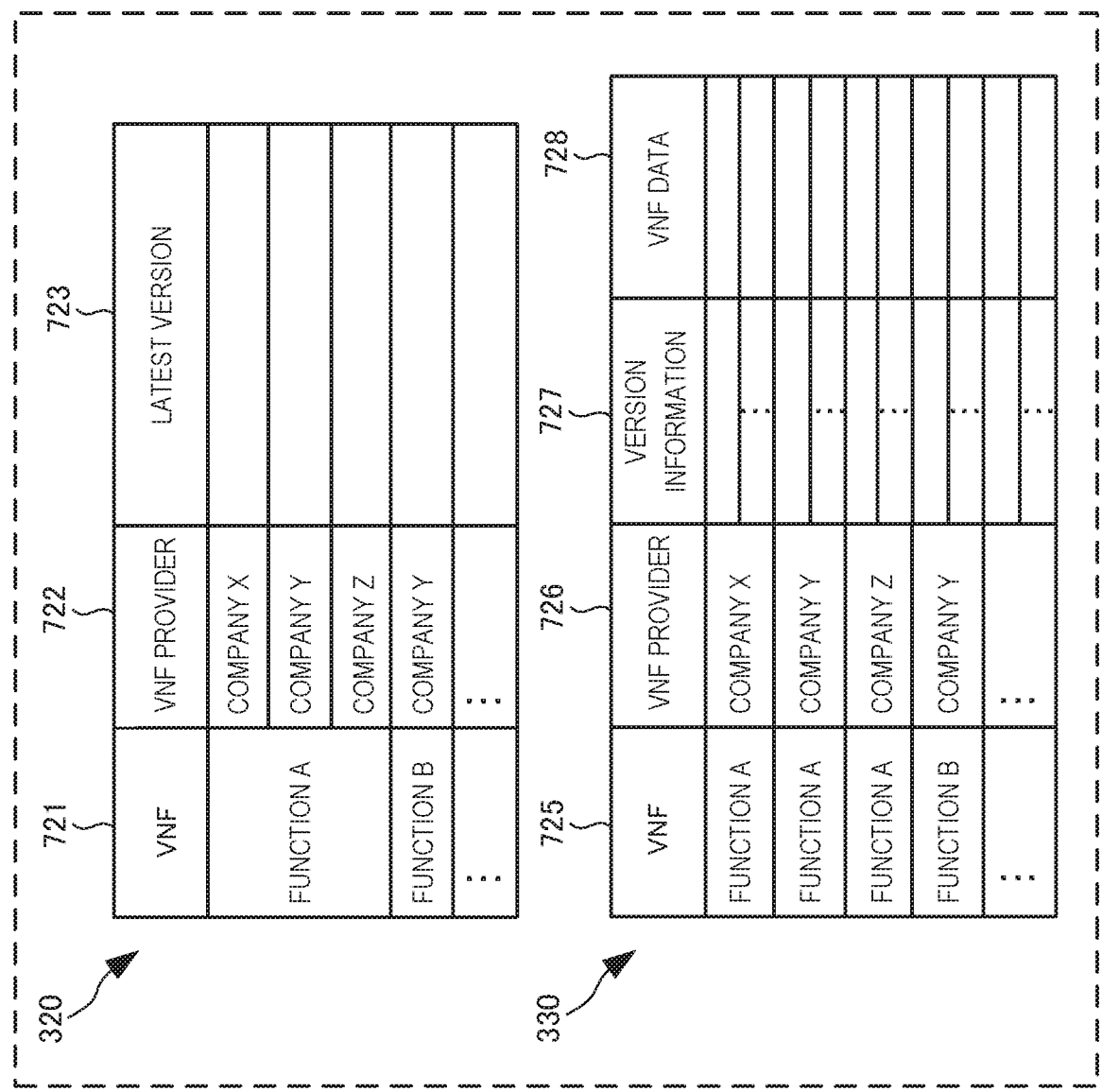
FIG. 7C is a view showing other structures of the version data and VNF data according to the second example embodiment of the present invention.

FIG. 7C is a view showing still other structures of the version data and VNF data according to this example embodiment. FIG. 7C shows the structure of the version data held in the version database 320 and that of the VNF data stored in the VNF database 330 when function provision by a plurality of VNF providers (third parties) is contracted for a plurality of functions.

The version database 320 stores a latest version 723 in association with each pair of a VNF 721 and a VNF provider 722. Note that a plurality of VNF providers (companies X to Z) may provide one function (function A).

The VNF database 330 stores version information 727 and VNF data 728 in association with each pair of a VNF 725 and a VNF provider 726. Note that a plurality of VNF providers may provide one function.

In FIG. 7C, in association with a plurality of provided functions and a plurality of VNF providers, it is confirmed whether the version is an appropriate one.

(Version Confirmation in Consideration of Operator Who Instructs Activation or Change)

FIG. 7D is a view showing still other structures of the version data and VNF data according to this example embodiment. FIG. 7D shows the structure of the version data held in the version database 320 and that of the VNF data stored in the VNF database 330 when an operator who instructs to activate or change a VNF is considered.

The version database 320 stores an appropriate version 733 in association with an operator 731 and each VNF 732.

The VNF database 330 stores version information 737 and a VNF data 738 in association with an operator 735 and each VNF 736.

In FIG. 7D, in consideration of an operator who instructs to activate or change a VNF, it is confirmed whether the version is an appropriate one.

(Addition of Authentication by Digital Signature)

Figure 7E:
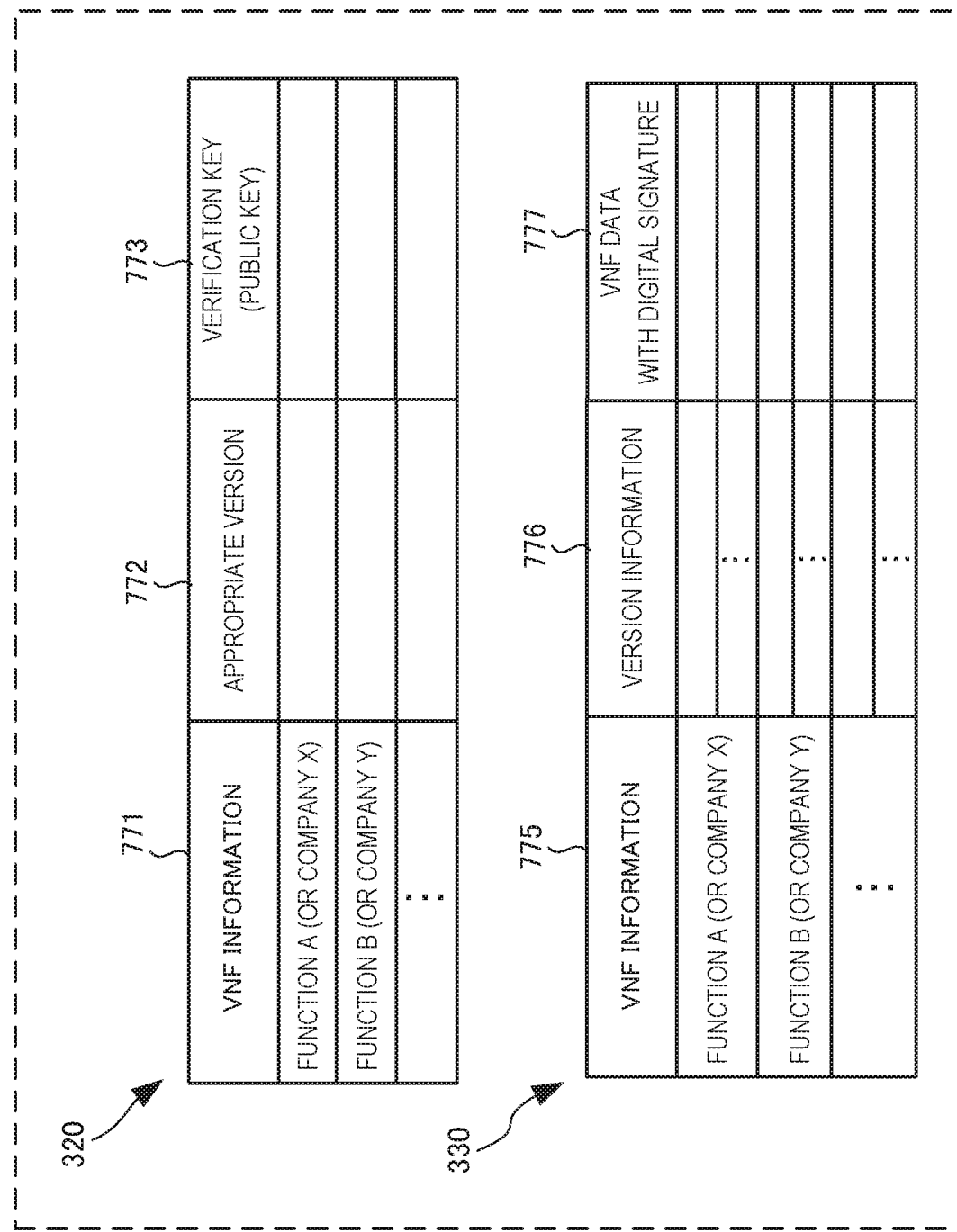
FIG. 7E is a view showing still other structures of the version data and VNF data according to the second example embodiment of the present invention.

FIG. 7E is a view showing still other structures of the version data and VNF data according to this example embodiment. FIG. 7E shows structures for adding a digital signature based on VNF provider information in addition to version confirmation.

The version database 320 stores an appropriate version 772 and a verification key (public key) 773 in association with each VNF 771.

The VNF database 330 stores version information 776 and VNF data 777 with a digital signature in association with each VNF 775.

In FIG. 7E, a digital signature is generated based on a VNF provider in correspondence with VNF information, and authenticated.

(Valid Period of Virtual Network Function)

FIG. 7F is a table showing still other structure of the VNF data according to this example embodiment. FIG. 7F is a table showing a case in which the valid period of a virtual network function is set according to this example embodiment.

In the VNF database 330, version information 786, VNF data 787, and a valid period 788 are set in association with each VNF 785.

If the valid period ends, the VNF data 787 is deleted or disabled. A VNF provider is notified of the end of the valid period, and a new VNF is registered.

<<Procedure of VNF Activation/Change Processing of Control Apparatus>>

Figure 8A:
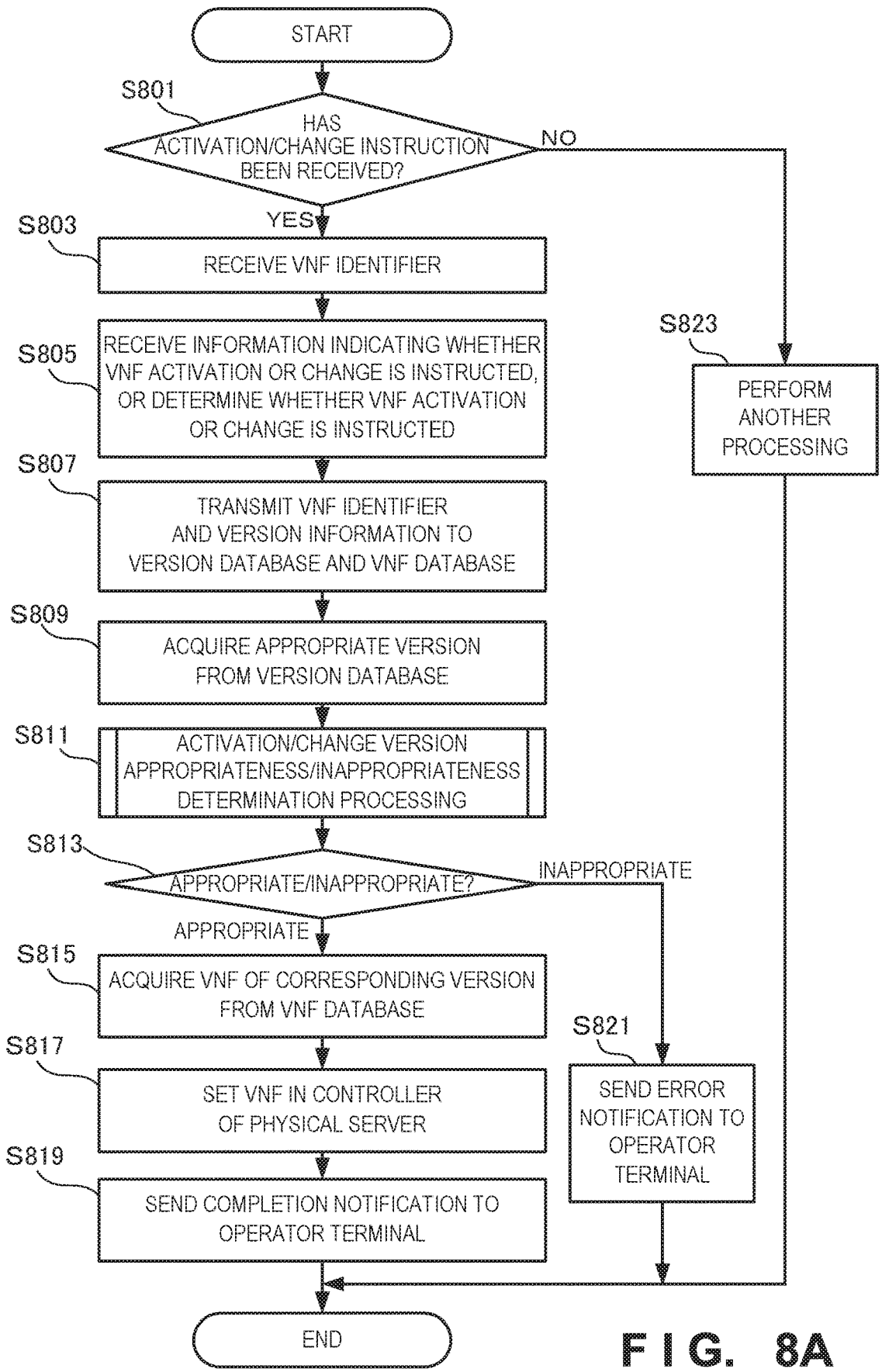
FIG. 8A is a flowchart illustrating the procedure of the VNF activation/change processing of the control apparatus according to the second example embodiment of the present invention.

FIG. 8A is a flowchart illustrating the procedure of VNF activation/change processing as the virtual network control of the control apparatus 310 according to this example embodiment.

In step S801, the control apparatus 310 determines whether a VNF activation or change instruction has been received from the operator terminal 210. If it is determined that the VNF activation or change instruction has been received, the control apparatus 310 receives, in step S803, a VNF identifier corresponding to function information input from the operator terminal 210. Note that in FIG. 7A described above, the function information may be received as VNF provider information. Next, in step S805, the control apparatus 310 receives information indicating whether the operator instruction is a VNF activation instruction or a VNF change instruction. If the information is received, the control apparatus 310 receives the selection input of the operator indicating VNF activation or change, or a determination result based on a target virtual network service and a target VNF in the operation management apparatus 350. In step S805, based on the target virtual network service and the target VNF, the control apparatus 310 may determine whether the operator instruction is a VNF activation instruction or a VNF change instruction. In the processing of determining whether the operator instruction is a VNF activation instruction or a VNF change instruction, whether a new VNF is to be activated or the VNF is to be changed (replaced) is determined with reference to a VNF currently operating as the target virtual network service, its route, and the like.

In step S807, the control apparatus 310 requests data response transmission by transmitting the VNF identifier and version information to the version database 320 and the VNF database 330. In response to the transmission of the VNF identifier and version information, in step S809, the control apparatus 310 acquires appropriate version information associated with the VNF identifier from version database 320. In step S811, based on the acquired appropriate version information and the version information of the VNF to be activated or changed, the control apparatus 310 executes processing of determining whether the version of the VNF to be activated or changed is appropriate or inappropriate.

In step S813, the control apparatus 310 branches the processing based on the result of determining whether the version is appropriate or inappropriate. If the version is appropriate, the control apparatus 310 acquires, in step S815, VNF data associated with the VNF identifier and version information from the VNF database 330 in response to the transmission of the VNF identifier or version information. In step S817, the control apparatus 310 sets the VNF acquired from the VNF database 330 in the controller 342 of the target physical server 341. In step S819, the control apparatus 310 sends, to the operator terminal 210, a completion notification of activation or change of the target VNF in the target virtual network service. On the other hand, if the version is inappropriate, in step S821 the control apparatus 310 determines that the version is inappropriate, and sends, to the operator terminal 210, an error notification of activation or change of the VNF.

Note that if it is determined that neither a VNF activation instruction nor a VNF change instruction has been received from the operator terminal 210, the control apparatus 310 performs, in step S823, processing other than the VNF activation or change processing. The other processing includes VNF registration or update processing (to be described later), and path control and route control without the VNF activation or change processing.

(Appropriateness/Inappropriateness Determination Processing)

Figure 8B:
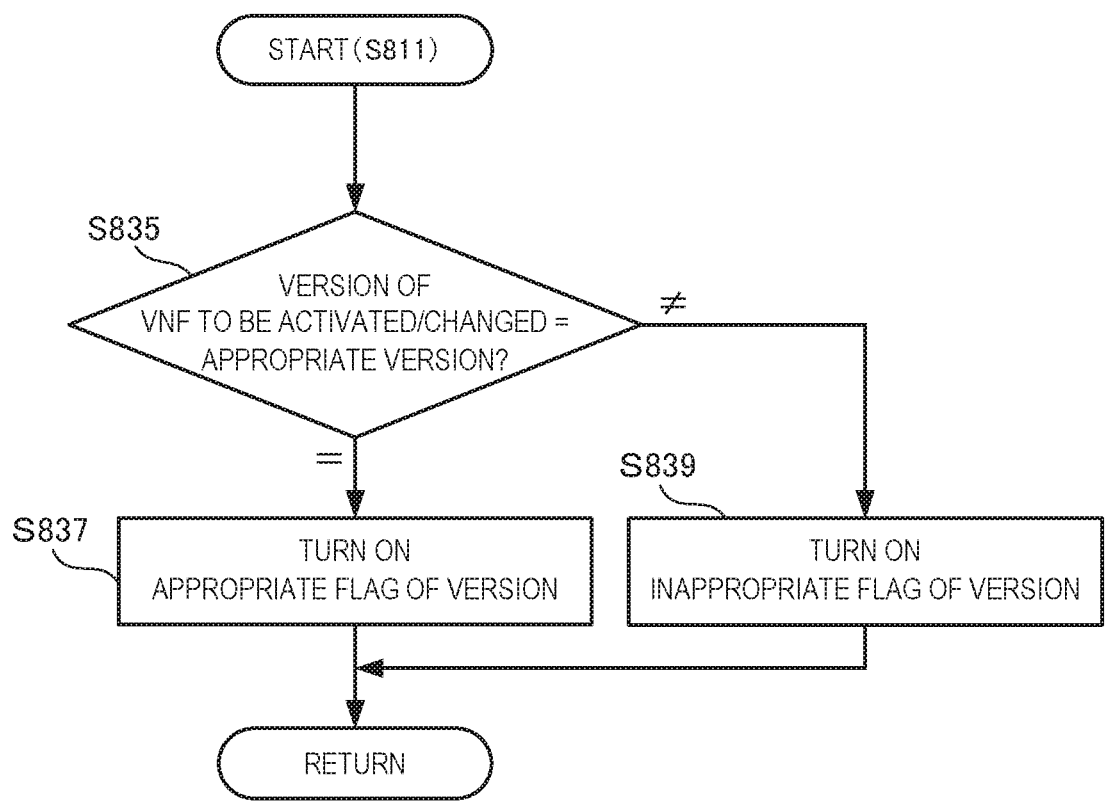
FIG. 8B is a flowchart illustrating the procedure of version validity/invalidity determination processing according to the second example embodiment of the present invention.

FIG. 8B is a flowchart illustrating the procedure of the version appropriateness/inappropriateness determination processing (step S811) according to this example embodiment.

In step S835, the control apparatus 310 determines whether the version of the VNF to be activated or changed is equal to the appropriate version.

If the version of the VNF to be activated or changed is equal to the appropriate version, the control apparatus 310 turns on the appropriate flag of the version in step S837; otherwise, the control apparatus 310 turns on the inappropriate flag of the version in step S839.

Note that in this example embodiment, the control apparatus 310 executes the version appropriateness/inappropriateness determination processing. However, the version database 320 may execute the version appropriateness/inappropriateness determination processing.

According to this example embodiment, if an operator is to provide a virtual network service based on a virtual network function, the version of the virtual network function instructed to be activated or changed is confirmed, and it is thus possible to select a virtual network function of an appropriate version, and prevent a malfunction of a virtual network.

Third Example Embodiment

A virtual network system according to the third example embodiment of the present invention will be described next. The virtual network system according to this example embodiment is different from that according to the above-described second example embodiment in that when a third party registers or updates a virtual network function, processing of registering a virtual network function of an appropriate version and its version information with reference to version information is included. The remaining components and operations are the same as those in the second example embodiment. Hence, the same reference numerals denote the same components and operations, and a detailed description thereof will be omitted. That is, version confirmation processing in an activation or change instruction of the virtual network function by the operator is the same as in the second example embodiment, and a description thereof will be omitted in this example embodiment.

<<Virtual Network System>>

The virtual network system according to this example embodiment will be described in detail below with reference to FIGS. 9A to 11B. Note that in this example embodiment, only registration or update of a virtual network function will be described. Thus, in the virtual network system and a control apparatus, components associated with activation or change of a virtual network function are omitted.

(Outline of Registration Operation)

Figure 9A:
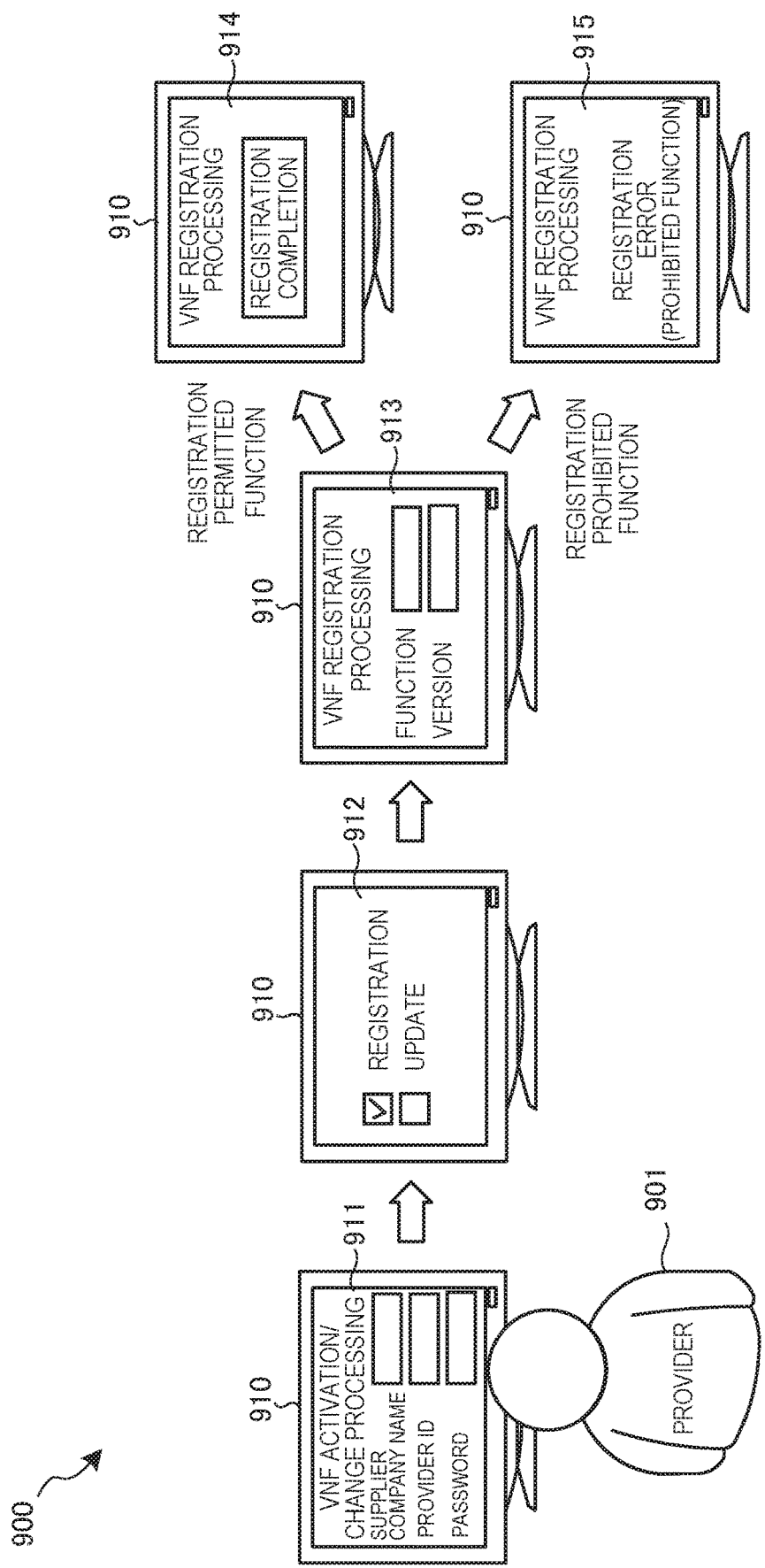
FIG. 9A is a view showing an outline of the operation of a virtual network system according to the third example embodiment of the present invention.

FIG. 9A is a view showing an outline of the operation of a virtual network system 900 according to this example embodiment. FIG. 9A shows display examples of a third party terminal 910 operated by a VNF provider (third party) 901 who instructs to register or update a virtual network function during the operation according to this example embodiment.

A display screen 911 is a screen for authenticating whether the VNF provider 901 has authority to register or update a VNF. The VNF provider 901 is authenticated by inputting a supplier company name, a provider ID, and a password.

If the VNF provider 901 is authenticated, he/she instructs to register a VNF on a display screen 912. Note that whether to register or update a VNF may be selected based on a VNF storage state of a VNF database 330, which complicates the condition. Thus, in this example embodiment, assume that the VNF provider 901 inputs the selection.

Next, the VNF provider 901 inputs, from a display screen 913, a function (VNF) to be registered and its version information. According to this example embodiment, it is determined whether the VNF provider 901 is permitted to register a function (VNF). If the VNF provider 901 is permitted to register a VNF, information indicating VNF registration completion is displayed on a display screen 914 of the third party terminal 910; otherwise, a VNF registration error (for example, a reason as the factor of the error such as VNF registration that is not permitted for the VNF provider) is displayed on a display screen 915 of the third party terminal 910.

Note that in this example embodiment, authentication information indicating whether the target VNF may be registered, that is, authentication information for preventing the target VNF from being unauthorizedly registered, altered, or erroneously registered is generated and registered. In this case, a digital signature that authenticates the VNF based on provider information is used as the authentication information. A digital signature is generated using a signature key (private key) based on VNF information and provider information, a VNF with the digital signature is stored in the VNF database, and a verification key (public key) generated accordingly is saved in an authentication server.

(Outline of Update Operation)

Figure 9B:
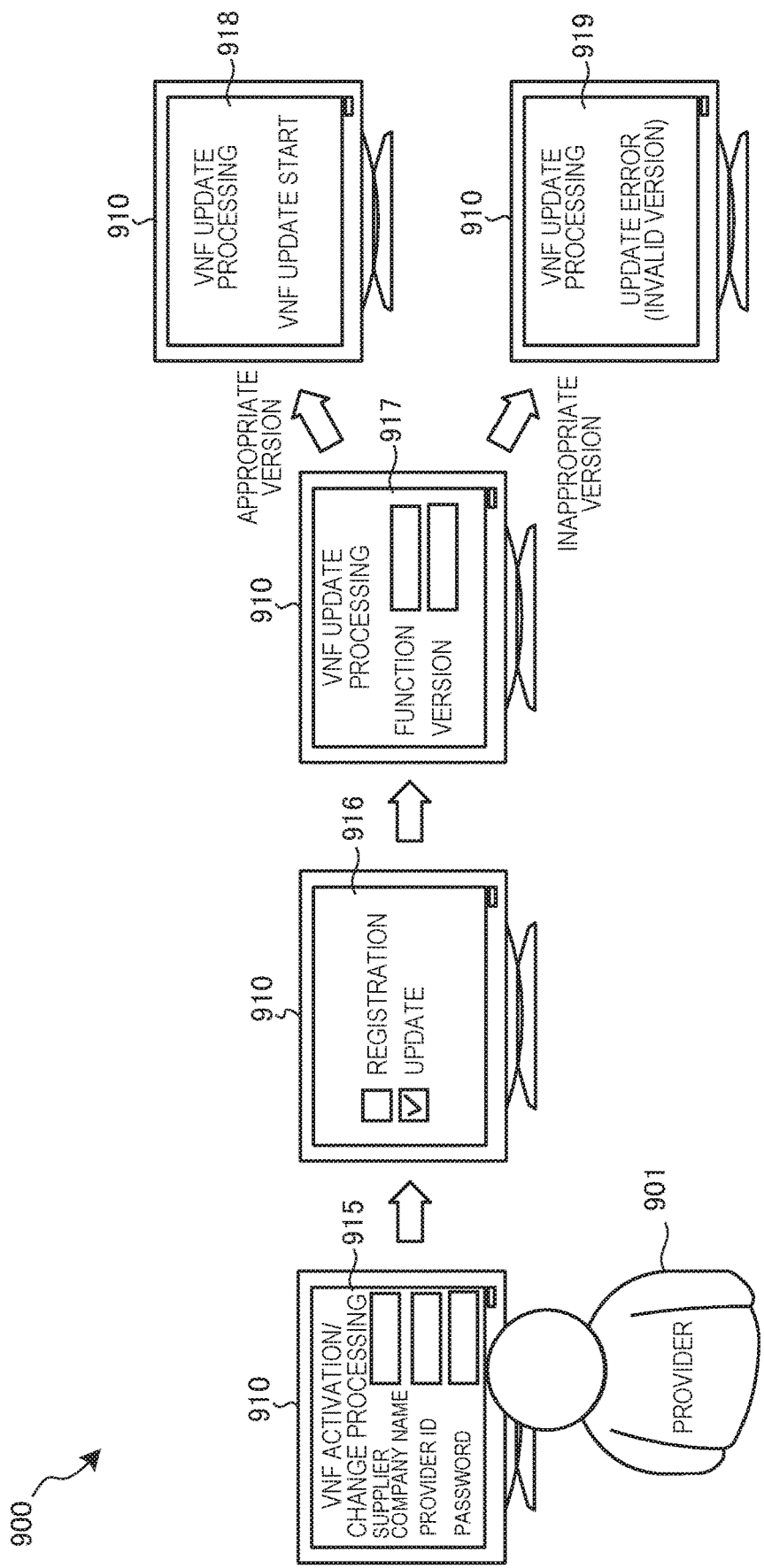
FIG. 9B is a view showing an outline of the operation of the virtual network system according to the third example embodiment of the present invention.

FIG. 9B is a view showing an outline of the operation of the virtual network system 900 according to this example embodiment. FIG. 9B shows display examples of the third party terminal 910 operated by the VNF provider (third party) 901 who instructs to register or update a virtual network function during the operation according to this example embodiment.

Similarly to FIG. 9A, the display screen 915 is a screen for authenticating whether the VNF provider 901 has authority to register or update a VNF. The VNF provider 901 is authenticated by inputting a supplier company name, a provider ID, and a password. If the VNF provider 901 is authenticated, he/she instructs to update a VNF on a display screen 916.

Next, the VNF provider 901 inputs, from a display screen 917, a function (VNF) to be registered and its version information. According to this example embodiment, whether the VNF to be updated may be read out and updated, that is, the version of the VNF to be updated is confirmed. In this example embodiment, the version of the VNF to be updated is confirmed using an appropriate version of a VNF saved in a version database. Note that if the VNF is updated by adding a new version without reading out the existing VNF, the same procedure as the registration processing procedure shown in FIG. 9A is performed.

If the version is confirmed, the VNF read out from the VNF database is read out as a VNF to be updated, and information indicating the VNF update start is displayed on a display screen 918 of the third party terminal 910. On the other hand, if the versions do not match each other, the update processing of the VNF is terminated without reading out the VNF from the VNF database, and information indicating that an update error has occurred and its factor is the invalid version is displayed on a display screen 919 of the third party terminal 910.

Note that as the VNF obtained by reading out and updating the existing VNF, a VNF of a new version is stored. Storage of the VNF of the new version may be implemented by overwriting the old VNF or additionally storing the VNF as a new version. The processing of storing the VNF of the new version and version information is the same as the VNF registration processing shown in FIG. 9A, and an illustration and description thereof will be omitted.

(System Arrangement)

Figure 10:
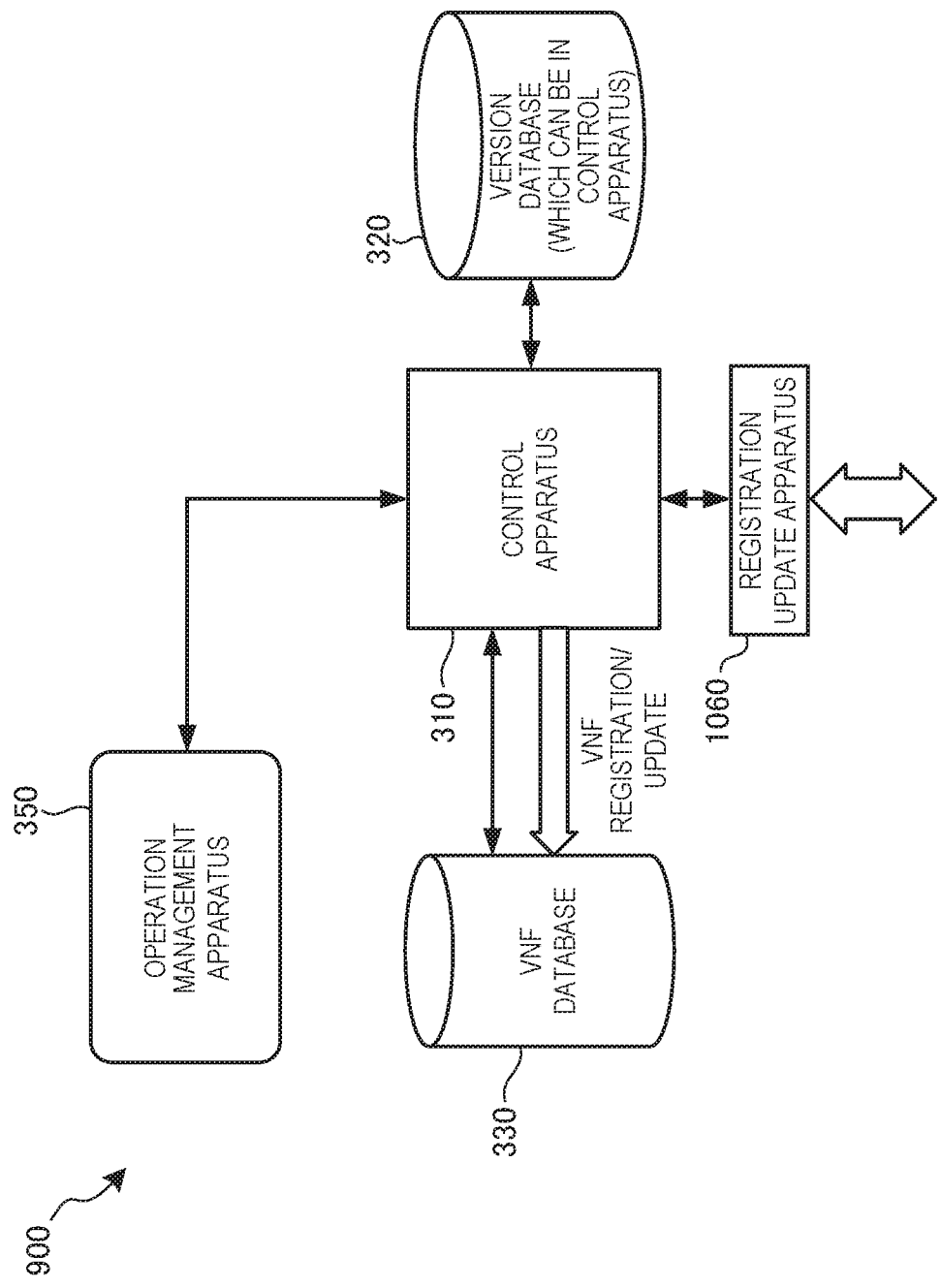
FIG. 10 is a block diagram showing the arrangement of the virtual network system according to the third example embodiment of the present invention.

FIG. 10 is a block diagram showing the arrangement of the virtual network system 900 according to this example embodiment. Note that in FIG. 10, the same reference numerals as those in FIG. 3A denote the same functional components, and a description of the same processing will be omitted. In the virtual network system 900, an arrangement related to VNF registration or update is shown but no arrangement related to VNF activation or change in FIG. 3A is shown.

In the virtual network system 900, a control apparatus 310 controls registration of a VNF and version information of this example embodiment or version confirmation for VNF update, and update of the VNF based on the result. A version database 320 acquires appropriate version information based on version information in VNF registration of this example embodiment. The version database 320 also holds version information for confirmation in VNF update. Note that the version database 320 may be provided in the control apparatus 310. A VNF database 330 stores the VNF and version information to be searchable by provider information, a VNF identifier, or the like. A search key is not limited to the provider information or VNF identifier, as shown in FIGS. 7A to 7F, and is variously selected to prevent occurrence of a malfunction of a virtual network caused by a mismatch of the VNF.

A registration update apparatus 1060 is connected to the third party terminal 910, and transmits a VNF registration or update instruction to the control apparatus 310.

Referring to FIG. 10, if the authenticated third party terminal 910 requests to register a VNF, the VNF that is permitted to be registered by the VNF provider, and its version information are stored in the VNF database 330 to be searchable by the function or provider. Based on the version information of the registered VNF, an appropriate version is saved in the version database 320 to be searchable by the function or provider.

On the other hand, if the authenticated third party terminal 910 requests to update a VNF, version confirmation which has been performed to activate or change the VNF is executed. This version confirmation processing is the same as that performed to activate or change the VNF and a description thereof will be omitted. If a version confirmation result is valid, the VNF in the VNF database 330 is read out, the third party terminal 910 sends an update instruction, and then processing of registering the VNF added with the updated version information in the VNF database 330 is performed again.

On the other hand, if the version is not OK, the VNF update processing is terminated, and the third party terminal 910 notifies the provider of a VNF update error via the registration update apparatus 1060.

(Registration Operation Procedure)

Figure 11A:
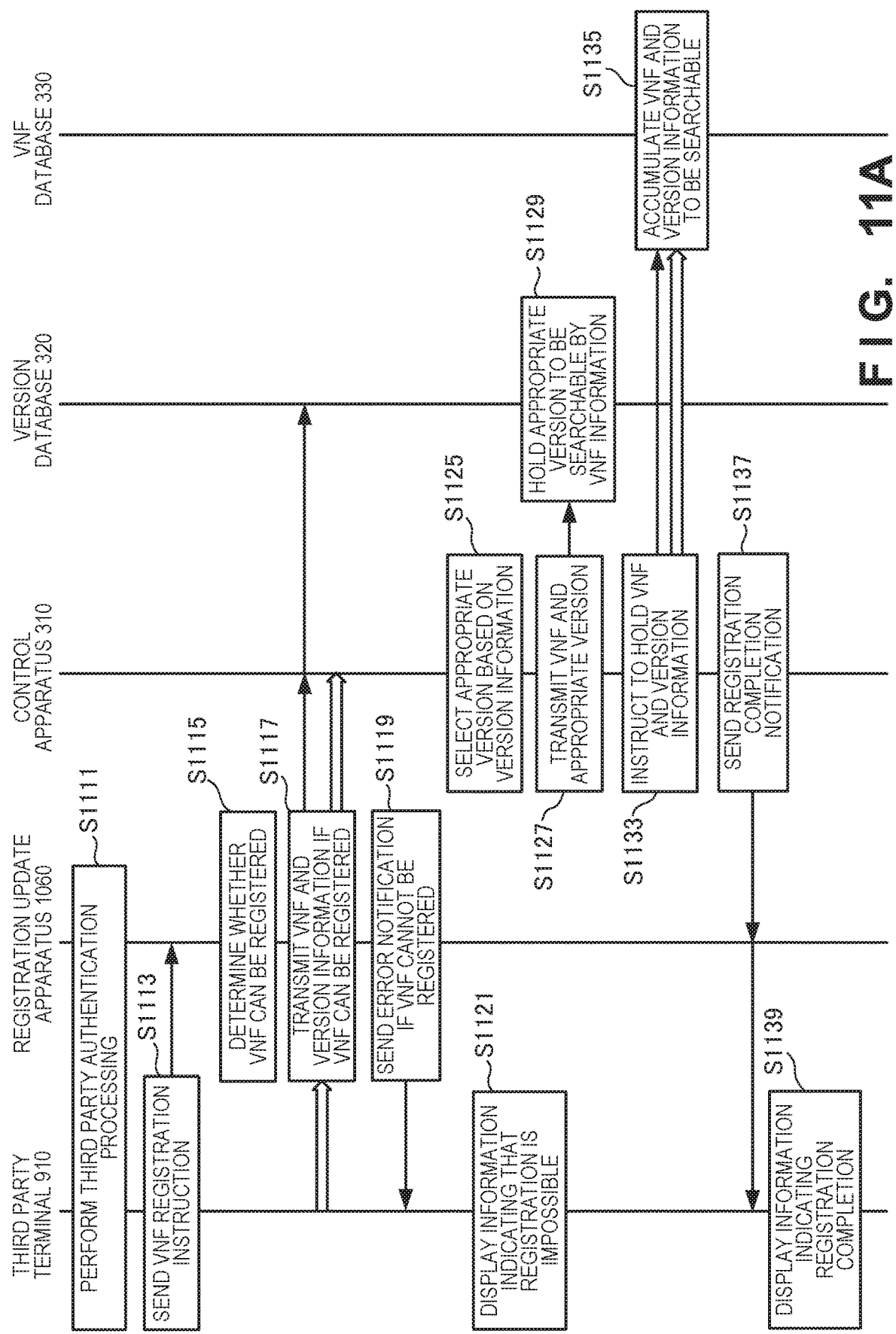
FIG. 11A is a sequence chart showing the registration operation procedure of the virtual network system according to the third example embodiment of the present invention.

FIG. 11A is a sequence chart showing the registration operation procedure of the virtual network system 900 according to this example embodiment.

In step S1111, VNF provider authentication processing is performed between the third party terminal 910 and the registration update apparatus 1060. If VNF provider authentication is OK, the third party terminal 910 instructs, in step S1113, the registration update apparatus 1060 to register a VNF.

In step S1115, the registration update apparatus 1060 determines whether the VNF to be registered is a VNF that may be registered by the VNF provider. If it is determined that the VNF may be registered by the VNF provider, the registration update apparatus 1060 transmits, in step S1117, the VNF to be registered and version information to the control apparatus 310, and requests to register the VNF. The control apparatus 310 also transmits the VNF registration request to the version database 320. On the other hand, if it is determined that the VNF may not be registered by the VNF provider, the registration update apparatus 1060 sends, in step S1119, an error notification to the third party terminal 910. In step S1121, the third party terminal 910 notifies the provider of the error by displaying information indicating that registration is impossible.

In step S1125, the control apparatus 310 selects an appropriate version based on the version information. In step S1127, the control apparatus 310 transmits the selected version information to the version database 320. In step S1129, the version database 320 holds the received version information to be searchable by the provider information (or function information).

In step S1133, the control apparatus 310 instructs the VNF database 330 to store the VNF and its version information. In step S1135, the VNF database 330 accumulates the VNF and its version information to be searchable by the VNF provider (or function information).

In step S1137, the control apparatus 310 notifies the third party terminal 910 of VNF registration completion. In step S1139, the third party terminal 910 displays information indicating the VNF registration completion.

(Update Operation Procedure)

Figure 11B:
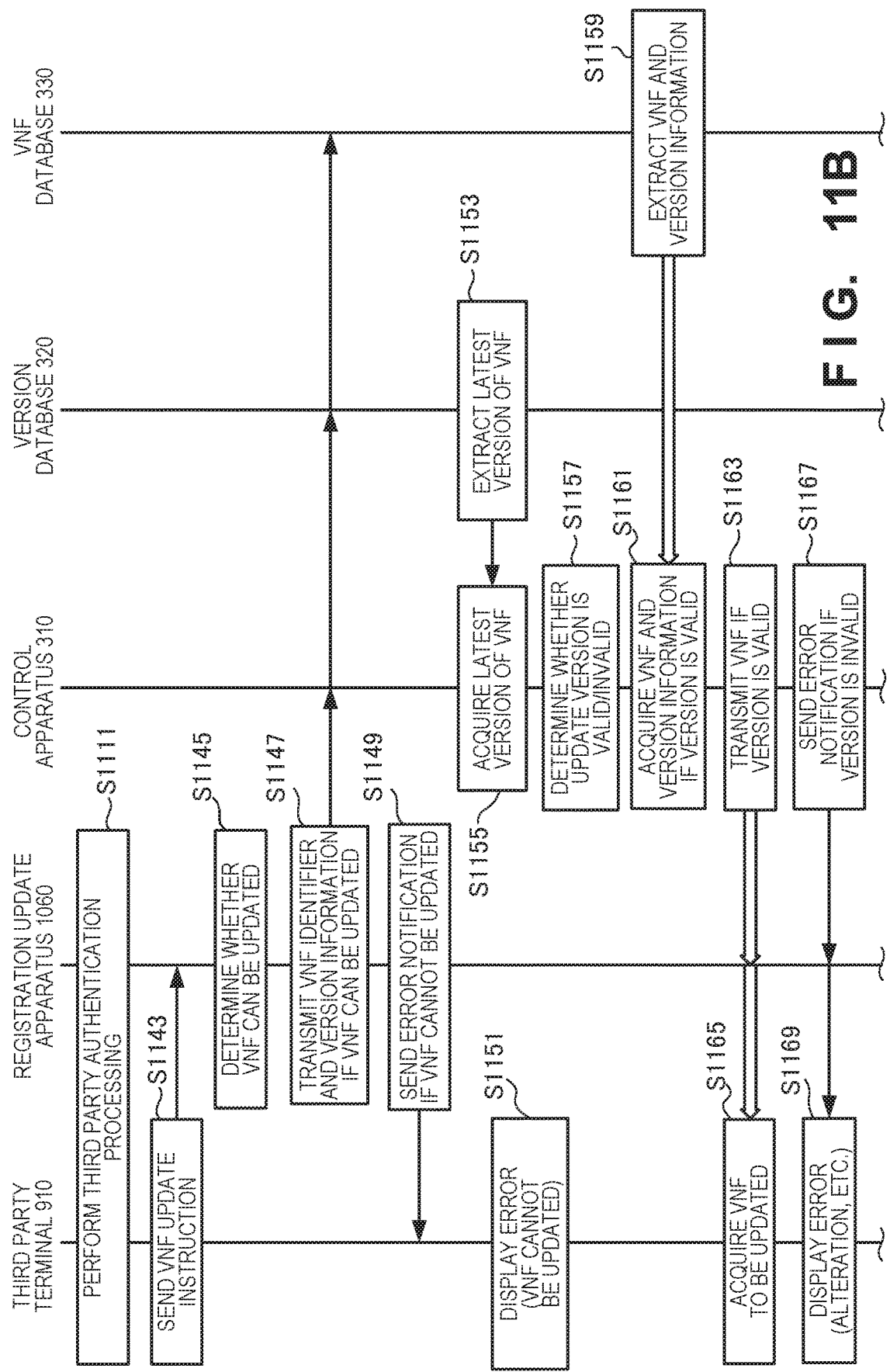
FIG. 11B is a sequence chart showing the update operation procedure of the virtual network system according to the third example embodiment of the present invention.

FIG. 11B is a sequence chart showing the update operation procedure of the virtual network system 900 according to this example embodiment. Note that the same step numbers as those in FIG. 11A denote the same steps and a description thereof will be omitted.

If third party authentication is OK, the third party terminal 910 instructs, in step S1143, the registration update apparatus 1060 to update a VNF.

In step S1145, the registration update apparatus 1060 determines whether the VNF can be updated by the authenticated VNF provider (third party). If the VNF can be updated, the registration update apparatus 1060 transmits, in step S1147, a VNF identifier and version information to the control apparatus 310, and requests to acquire the VNF to be updated. The request to acquire the VNF to be updated is also transmitted to the version database 320 and the VNF database 330. On the other hand, if the VNF cannot be updated by the VNF provider, the registration update apparatus 1060 sends, in step S1149, to the third party terminal 910, an error notification indicating that update is impossible. In step S1151, the third party terminal 910 displays an error indicating that the VNF cannot be updated.

In step S1153, the version database 320 extracts an appropriate version (for example, the latest version) corresponding to the target VNF, and transmits it to the control apparatus 310. In step S1155, the control apparatus 310 acquires the appropriate version. In step S1157, using the version of the VNF to be updated and the acquired appropriate version, the control apparatus 310 determines whether the update version is valid or invalid.

If it is determined that the version of the VNF is valid, in step S1159 the VNF database 330 extracts VNF data of the target VNF and transmits it to the control apparatus 310. In step S1161, the control apparatus 310 acquires the VNF data. In step S1163, the control apparatus 310 transmits, as the VNF to be updated, the acquired VNF to the third party terminal 910. In step S1165, the third party terminal 910 acquires the VNF to be updated. Note that the VNF to be updated may be updated by the third party terminal 910 or updated by the control apparatus 310 based on an instruction of the third party terminal 910.

On the other hand, if it is determined that the version of the VNF is invalid, the control apparatus 310 notifies, in step S1167, the third party terminal 910 of an error by determining that the acquired VNF is inappropriate, and terminating the acquisition of the VNF. In step S1169, the third party terminal 910 displays, on the screen, an acquisition error of the VNF whose version is inappropriate, thereby notifying the VNF provider of the error.

Registration of the updated VNF is the same as the registration operation shown in FIG. 11A, and an illustration and description thereof will be omitted.

<<Functional Arrangement of Control Apparatus>>

Figure 12:
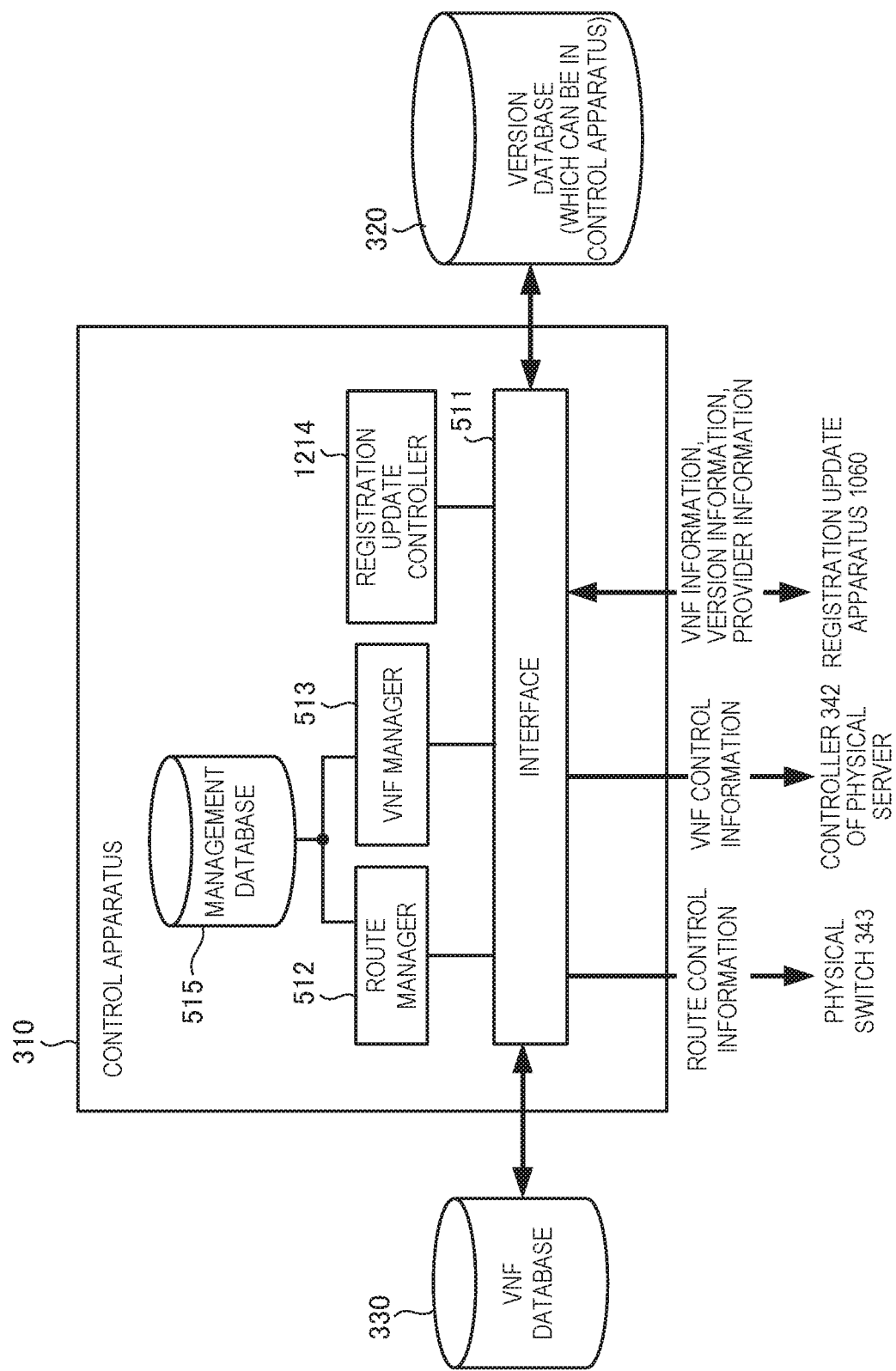
FIG. 12 is a block diagram showing the functional arrangement of a control apparatus according to the third example embodiment of the present invention.

FIG. 12 is a block diagram showing the functional arrangement of the control apparatus 310 according to this example embodiment. Note that in FIG. 12, the same reference numerals as those in FIG. 5A denote the same functional components and a description thereof will be omitted.

The control apparatus 310 further includes a registration update controller 1214. An interface 511 is connected to the registration update controller 1214 and the registration update apparatus 1060. The registration update controller 1214 controls registration processing and update processing of a VNF based on a VNF registration or update instruction that includes version information and has been received from the third party terminal 910 via the registration update apparatus 1060. In addition, the interface 511 notifies the third party terminal 910 of the processing result of the registration processing and update processing of the VNF via the registration update apparatus 1060.

<<Functional Arrangement of Registration Update Apparatus>>

Figure 13A:
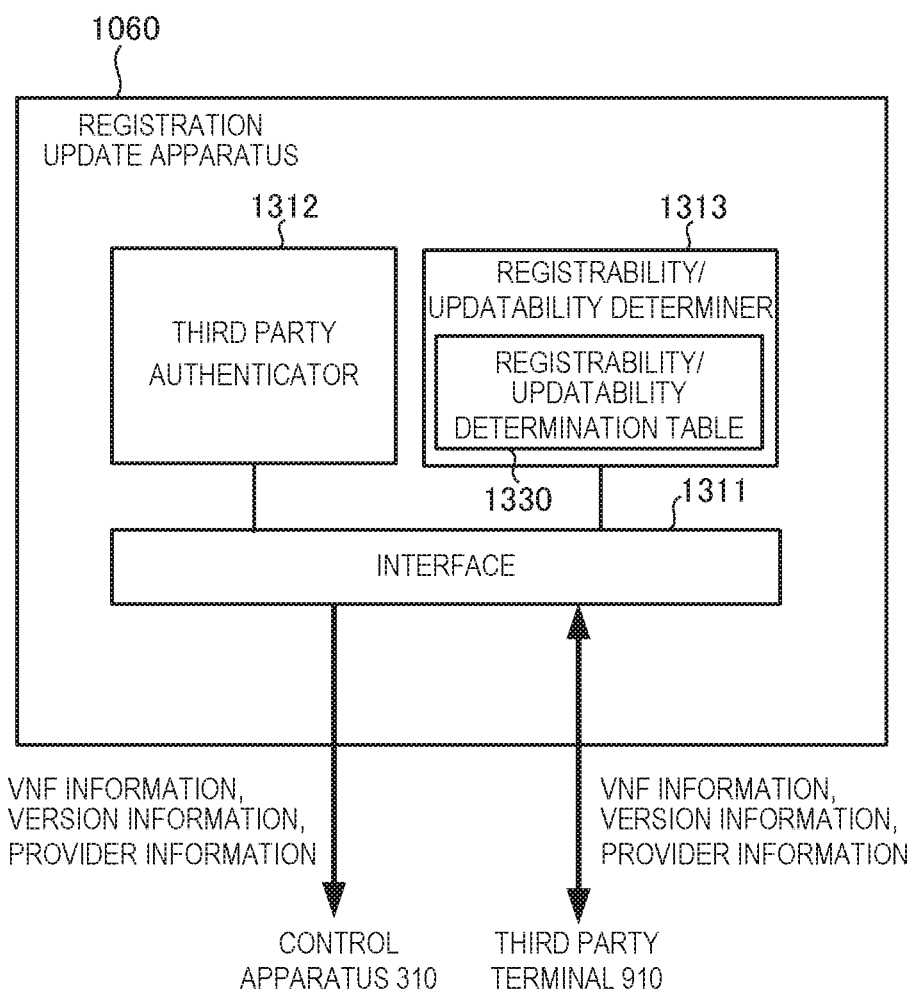
FIG. 13A is a block diagram showing the functional arrangement of a registration update apparatus according to the third example embodiment of the present invention.

FIG. 13A is a block diagram showing the functional arrangement of the registration update apparatus 1060 according to this example embodiment.

The registration update apparatus 1060 includes an interface 1311, a third party authenticator 1312, and a registrability/updatability determiner 1313.

The interface 1311 communicates with other components forming the virtual network system 900. In this example embodiment, the interface 1311 is connected to the third party terminal 910 to receive a VNF registration or update instruction input by a VNF provider, VNF information, version information, and provider information, and to transmit a VNF registration or update result to the third party terminal 910. Furthermore, the interface 1311 is connected to the control apparatus 310 to transmit, to the control apparatus 310, the VNF information, version information, and provider information received from the third party terminal 910 in this example embodiment.

The third party authenticator 1312 authenticates the third party terminal 910 and the VNF provider who operates the virtual network system 900 using the third party terminal 910. The registrability/updatability determiner 1313 includes a registrability/updatability determination table 1330, and determines whether the VNF provider is permitted to operate the VNF that is set as a registration or update target by the VNF provider.

(Registrability/Updatability Determination Table)

FIG. 13B is a table showing the structure of the registrability/updatability determination table 1330 according to this example embodiment. The registrability/updatability determination table 1330 is used to determine whether the VNF provider is permitted to operate the VNF that is set as a registration or update target by the VNF provider.

The registrability/updatability determination table 1330 stores a VNF (in FIG. 13B, a registrable/updatable function) 1332 for which an operation is permitted, in association with provider information (third party) 1331.

<<Procedure of VNF Registration/Update Processing of Control Apparatus>>

Figure 14A:
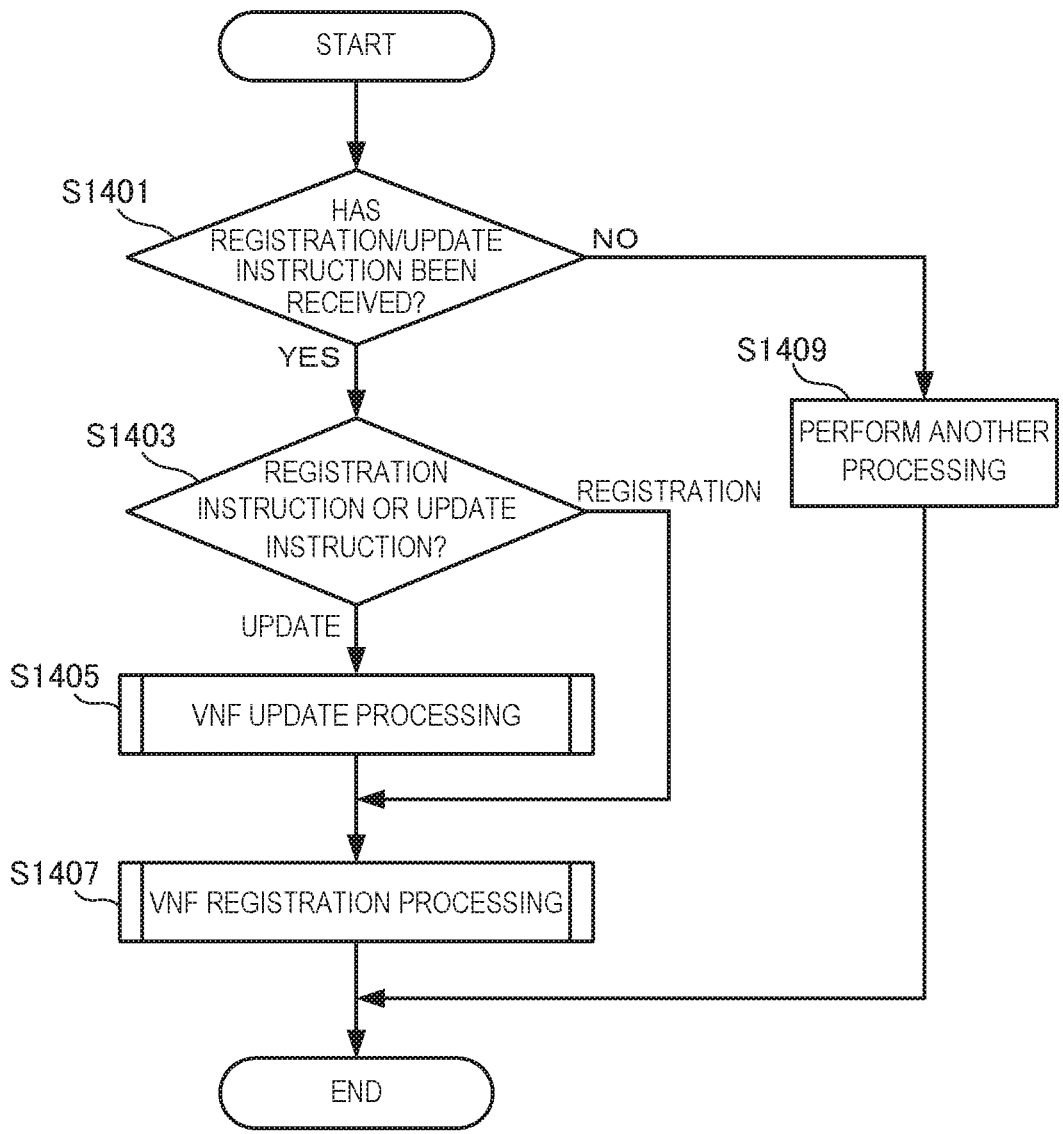
FIG. 14A is a flowchart illustrating the procedure of the VNF registration/update processing of the control apparatus according to the third example embodiment of the present invention.

FIG. 14A is a flowchart illustrating the procedure of the VNF registration/update processing of the control apparatus 310 according to this example embodiment.

In step S1401, the control apparatus 310 determines whether a VNF registration or update instruction has been received. If it is determined that a VNF registration or update instruction has been received, the control apparatus 310 determines in step S1403 whether the instruction is a registration instruction or an update instruction. If the instruction is an update instruction, the control apparatus 310 executes VNF update processing in step S1405. After the update processing, the control apparatus 310 executes VNF registration processing in step S1407. On the other hand, if the instruction is registration processing, the control apparatus 310 executes the VNF registration processing in step S1407. If the instruction is neither a VNF registration instruction nor a VNF update instruction, the control apparatus 310 performs processing other than the VNF registration processing and VNF update processing in step S1409. The other processing includes the above-described VNF activation or change processing, and path control and route control without the VNF activation or change processing.

(VNF Update Processing)

Figure 14B:
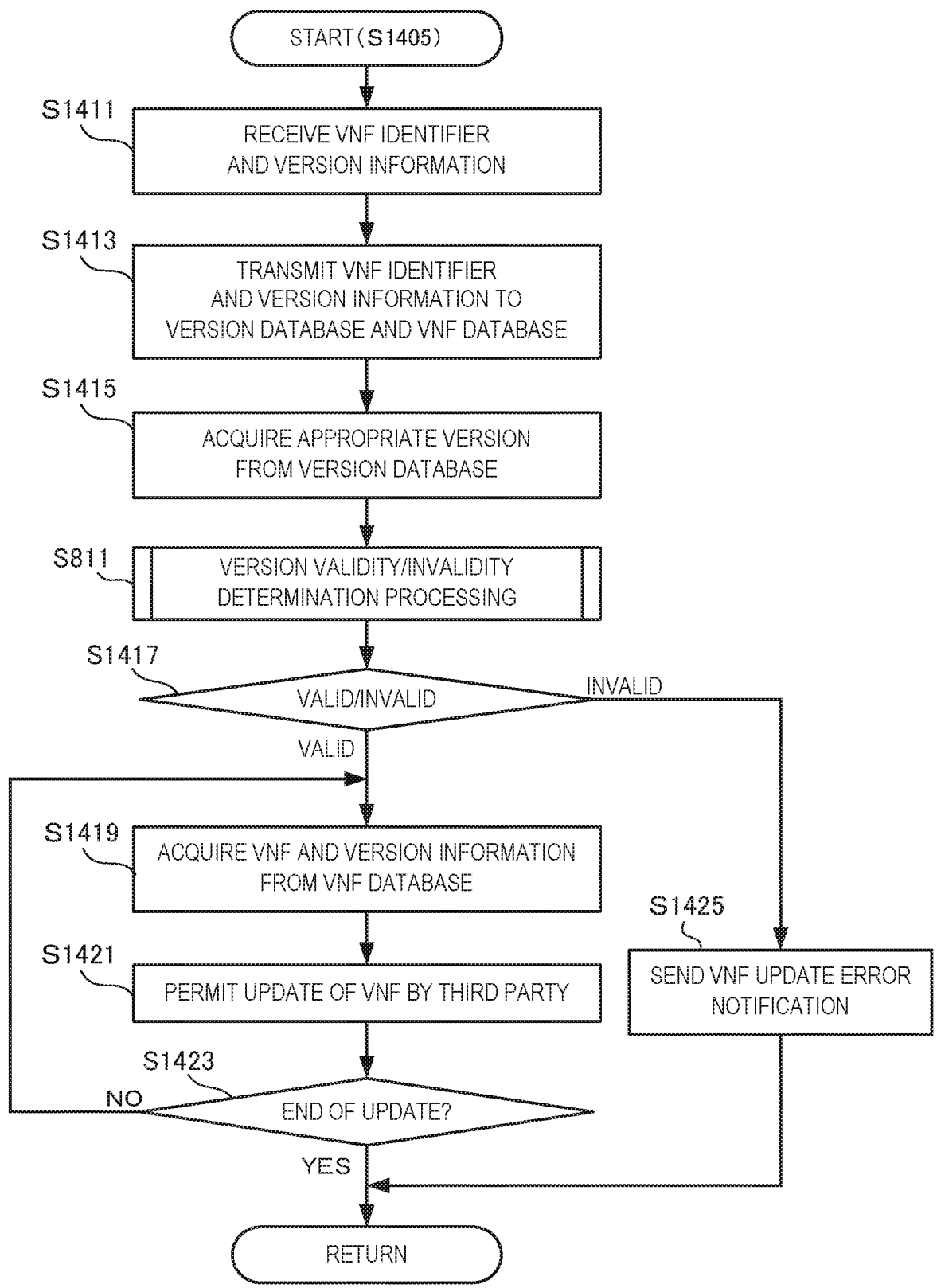
FIG. 14B is a flowchart illustrating the procedure of VNF update processing according to the third example embodiment of the present invention.

FIG. 14B is a flowchart illustrating the procedure of the VNF update processing (step S1405) according to this example embodiment.

In step S1411, the control apparatus 310 receives the identifier of the VNF to be registered and the version information from the registration update apparatus 1060. In step S1413, the control apparatus 310 transmits the identifier of the VNF to be registered and the version information to the version database 320 and the VNF database 330. In step S1415, the control apparatus 310 acquires appropriate version information corresponding to the VNF from the version database 320. In step S811, based on the version information of the VNF to be updated and the acquired appropriate version information, the control apparatus 310 executes processing of determining whether the version is valid or invalid. The algorithm in step S811 is the same as that in FIG. 8B.

In step S1417, the control apparatus 310 branches the processing based on a result of determining whether the version is valid or invalid. If the version is valid, the control apparatus 310 acquires, in step S1419, the VNF and version information from the VNF database 330. In step S1421, the control apparatus 310 permits update of the VNF acquired from the VNF database 330. In step S1423, the control apparatus 310 waits until the VNF update processing by the VNF provider ends. If the VNF update processing ends, the process returns. On the other hand, if the version is invalid, the control apparatus 310 notifies, in step S1425, the third party terminal 910 of a VNF update error, and the process returns.

(VNF Registration Processing)

Figure 14C:
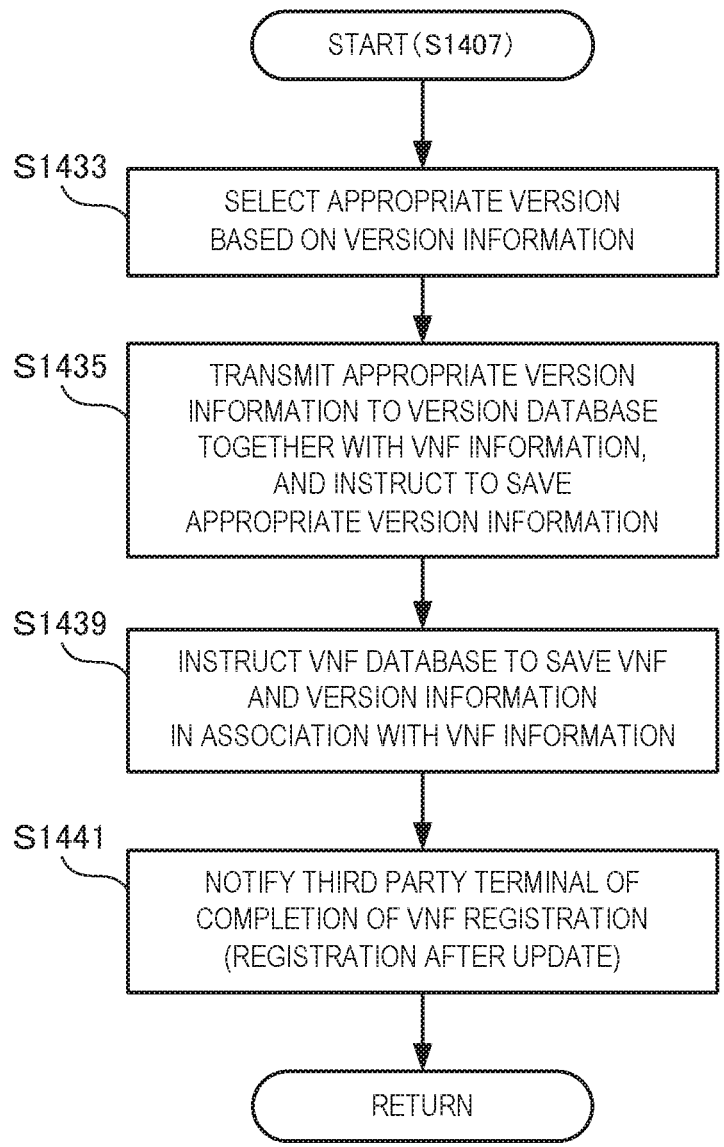
FIG. 14C is a flowchart illustrating the procedure of VNF registration processing according to the third example embodiment of the present invention.

FIG. 14C is a flowchart illustrating the procedure of the VNF registration processing (step S1407) according to this example embodiment.

In step S1433, the control apparatus 310 selects an appropriate version based on the version information of the VNF to be registered. In step S1435, the control apparatus 310 transmits the selected appropriate version to the version database 320 together with the VNF information, and instructs to save the appropriate version to be searchable by the provider information (or function).

In step S1439, the control apparatus 310 instructs the VNF database 330 to save the VNF and its version information to be searchable by the VNF information (or function).

In step S1441, the control apparatus 310 notifies the third party terminal 910 of registration completion for the VNF registration processing, and notifies the third party terminal 910 of update completion for the VNF update processing.

According to this example embodiment, if an operator is to provide a virtual network service based on a virtual network function, an appropriate version is selected together with confirmation of the version of the virtual network function instructed to be registered or updated, and it is thus possible to select the virtual network function of the appropriate version, and prevent a malfunction of a virtual network.

Fourth Example Embodiment

A virtual network system according to the fourth example embodiment of the present invention will be described next. The virtual network system according to this example embodiment is different from those according to the above-described second and third example embodiments in that occurrence of a malfunction of a virtual network caused by an inappropriate virtual network function in a virtual network system that integrates and manages a plurality of virtual network systems is prevented. The remaining components and operations are the same as those in the second and third example embodiments. Hence, the same reference numerals denote the same components and operations, and a detailed description thereof will be omitted.

<<Virtual Network System>>

The virtual network system according to this example embodiment will be described in detail below with reference to FIGS. 15 and 16. Note that functional elements in each virtual network system, for example, the components and operations of a control apparatus and the like are the same as those in the second or third example embodiment.

(System Arrangement)

Figure 15:
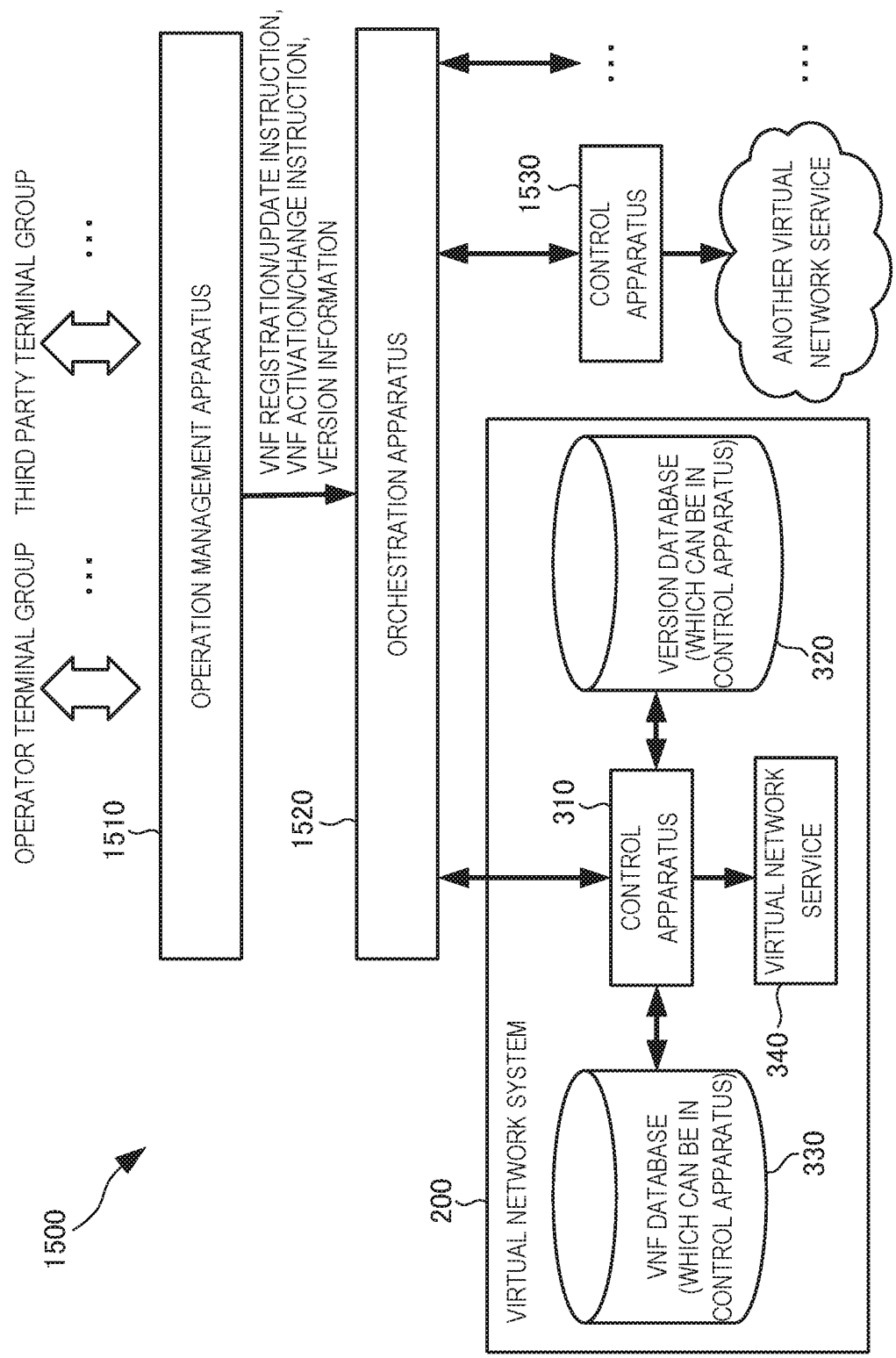
FIG. 15 is a block diagram showing the arrangement of a virtual network system according to the fourth example embodiment of the present invention.

FIG. 15 is a block diagram showing the arrangement of a virtual network system 1500 according to this example embodiment. Note that in FIG. 15, the same reference numerals as those in FIG. 3A denote the same functional components and a description thereof will be omitted.

The virtual network system 1500 includes a plurality of virtual network systems each corresponding to the virtual network system 200 shown in FIG. 3A or different network systems. For example, another virtual network system controlled by a control apparatus 1530 is shown. An orchestration apparatus 1520 that is connected to the plurality of virtual network systems or the different virtual network systems and integrally controls them is included. The orchestration apparatus 1520 receives a VNF registration/update instruction or VNF activation/change instruction via an operation management apparatus 1510 to which an operator terminal group and third party terminal group are connected, and integrally manages the plurality of virtual network systems or the different virtual network systems. Each of the plurality of network systems controlled by the orchestration apparatus is, for example, a carrier network, a data center, a transport network, or the like, and may be a network that virtually implements the network.

In the virtual network system 1500 of FIG. 15, each virtual network system has the same arrangement as that of the virtual network system 200 of FIG. 3A, and is configured to control a VNF registration/update instruction or VNF activation/change instruction, and perform VNF management and route management.

(Operation Procedure)

Figure 16:
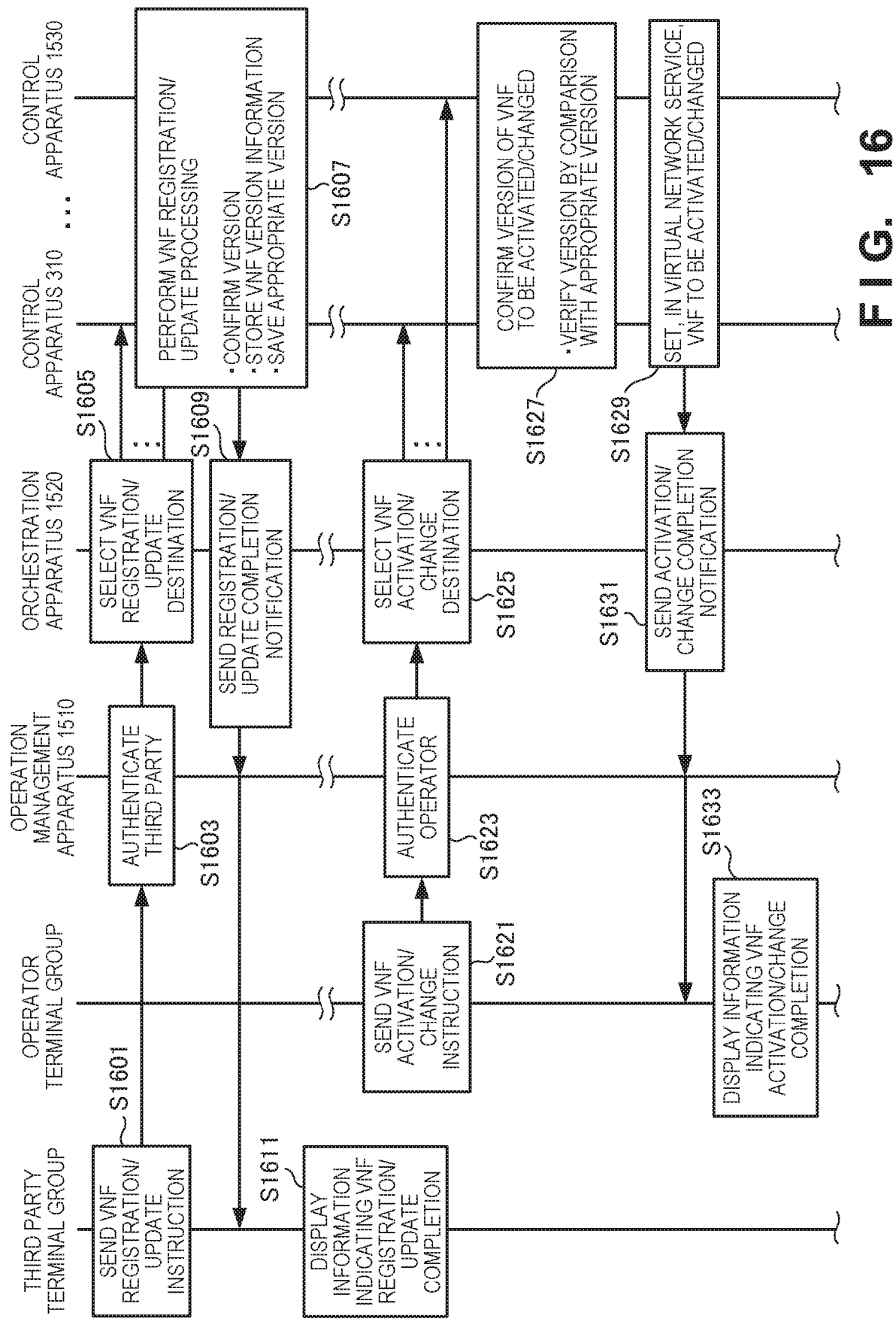
FIG. 16 is a sequence chart showing the operation procedure of the virtual network system according to the fourth example embodiment of the present invention.

FIG. 16 is a sequence chart showing the operation procedure of the virtual network system 1500 according to this example embodiment.

If, in step S1601, the third party terminal group sends a VNF registration or update instruction, the operation management apparatus 1510 authenticates a VNF provider (third party) in step S1603. If authentication is OK, the orchestration apparatus 1520 selects, in step S1605, a virtual network system as a VNF registration destination or that as a VNF update destination based on the VNF registration or update instruction. Then, the orchestration apparatus 1520 transmits the VNF registration or update instruction to a corresponding one of the control apparatuses 310, . . . , and 1530 that respectively control the virtual network systems.

Upon receiving the VNF registration or update instruction, the corresponding one of the control apparatuses 310, . . . , and 1530 executes, in step S1607, the following processing of this example embodiment as VNF registration or update processing. The first processing is confirmation of the version of the VNF to be registered or updated. The second processing is storage of the VNF and its version information. Third processing is saving of the selected appropriate version information (for example, the latest version information). Upon completion of the VNF registration or update processing in the virtual network system, the corresponding one of the control apparatuses 310, . . . , and 1530 notifies the orchestration apparatus 1520 of it. In step S1609, the orchestration apparatus 1520 notifies, via the operation management apparatus 1510, the third party terminal, that has requested to perform the VNF registration or update processing, of completion of the VNF registration or update processing. Upon receiving the notification, the third party terminal displays information indicating the VNF registration or update completion in step S1611. Note that an error case is not shown.

If, in step S1621, the operator terminal group sends a VNF activation or change instruction, the operation management apparatus 1510 authenticates an operator in step S1623. If authentication is OK, the orchestration apparatus 1520 selects, in step S1625, a virtual network system as a VNF activation destination or that as a VNF change destination based on the VNF activation or change instruction. Then, the orchestration apparatus 1520 transmits the VNF activation or change instruction to a corresponding one of the control apparatuses 310, . . . , and 1530 that respectively control the virtual network systems.

Upon receiving the VNF activation or change instruction, the corresponding one of the control apparatuses 310, . . . , and 1530 executes, in step S1627, the following processing of this example embodiment as VNF activation or change processing. That is, the version of the VNF is confirmed by comparison with the appropriate version information. In step S1629, the corresponding one of the control apparatuses 310, . . . , and 1530 sets, in the virtual network system, the VNF to be activated or changed. Upon completion of the VNF activation or change processing in the virtual network system, the corresponding one of the control apparatuses 310, . . . , and 1530 notifies the orchestration apparatus 1520 of it. In step S1631, the orchestration apparatus 1520 notifies, via the operation management apparatus 1510, the operator terminal, that has requested to perform the VNF activation or change processing, of completion of the VNF activation or change processing. In step S1633, the operator terminal displays information indicating the VNF activation or change completion. Note that an error case is not shown.

<<Functional Arrangement of Integration Control Apparatus>>

Figure 17:
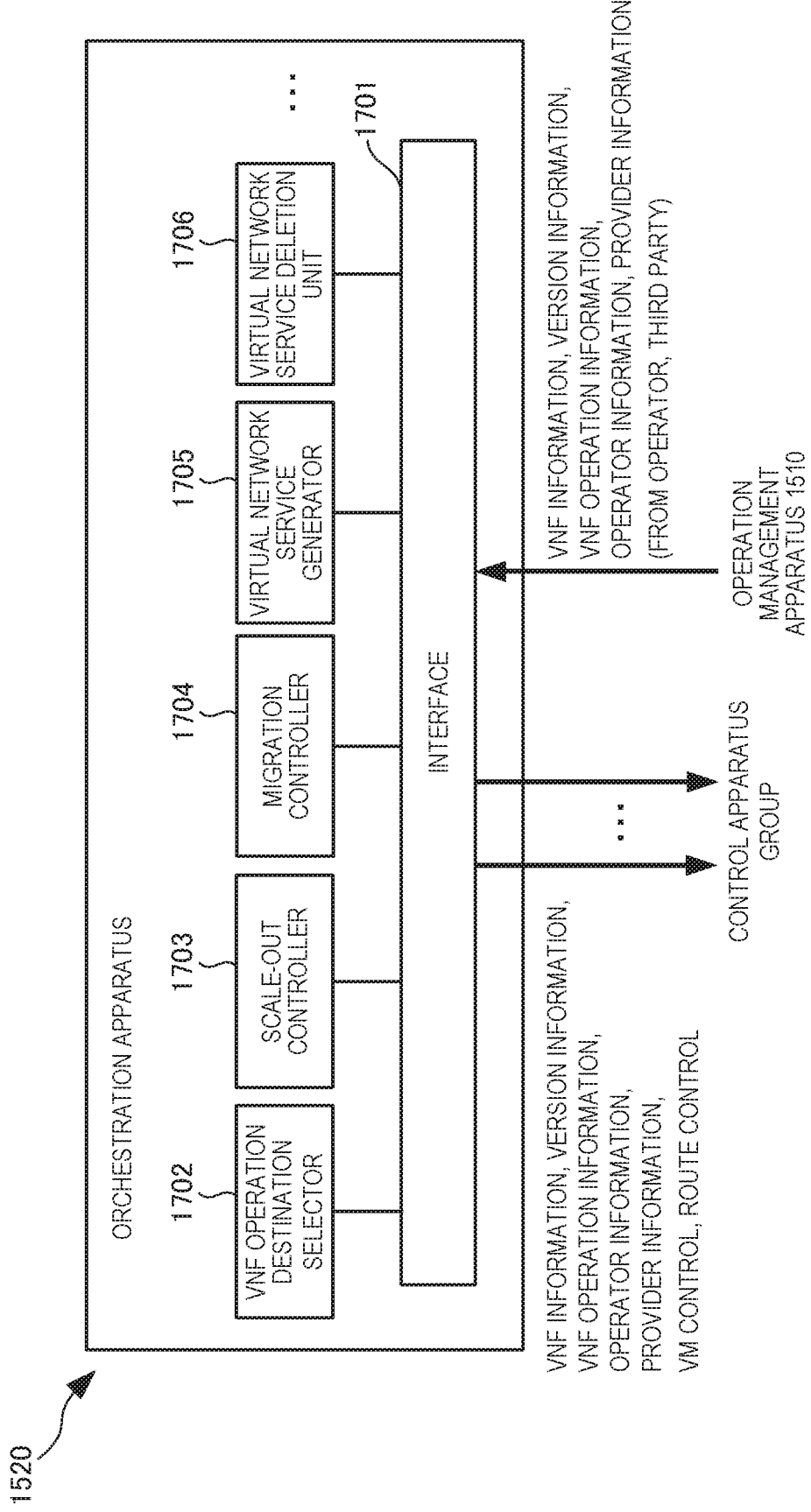
FIG. 17 is a block diagram showing the functional arrangement of an orchestration apparatus according to the fourth example embodiment of the present invention.

FIG. 17 is a block diagram showing the functional arrangement of the orchestration apparatus 1520 according to this example embodiment.

The orchestration apparatus 1520 includes an interface 1701 and respective function processors. The orchestration apparatus 1520 includes, as the function processor, a VNF operation destination selector 1702 that selects a virtual network system to process a VNF instructed to be registered/updated or activated/changed. Furthermore, the orchestration apparatus 1520 includes a scale-out controller 1703 that processes scale-out causing the function or change of the VNF, and a migration controller 1704 that processes migration. The orchestration apparatus 1520 also includes a virtual network service generator 1705 that generates a new virtual network service, and a virtual network service deletion unit 1706 that deletes an existing virtual network service. The function processors shown in FIG. 17 are merely examples, and another function controller for performing integration processing of the virtual network system 1500 may be connected.

The interface 1701 receives, via the operation management apparatus 1510, VNF information, version information, VNF operation information, operator information, provider information, and the like added to an instruction from the operator terminal group or third party terminal group, and transmits a processing result to the operator terminal group or third party terminal group. Furthermore, the interface 1701 transmits, to the control apparatus group, the VNF information, version information, VNF operation information, operator information, provider information, and the like for operating the virtual network service or VNF, and receives a processing result from the control apparatus group.

(Integration Control Table)

Figure 18:
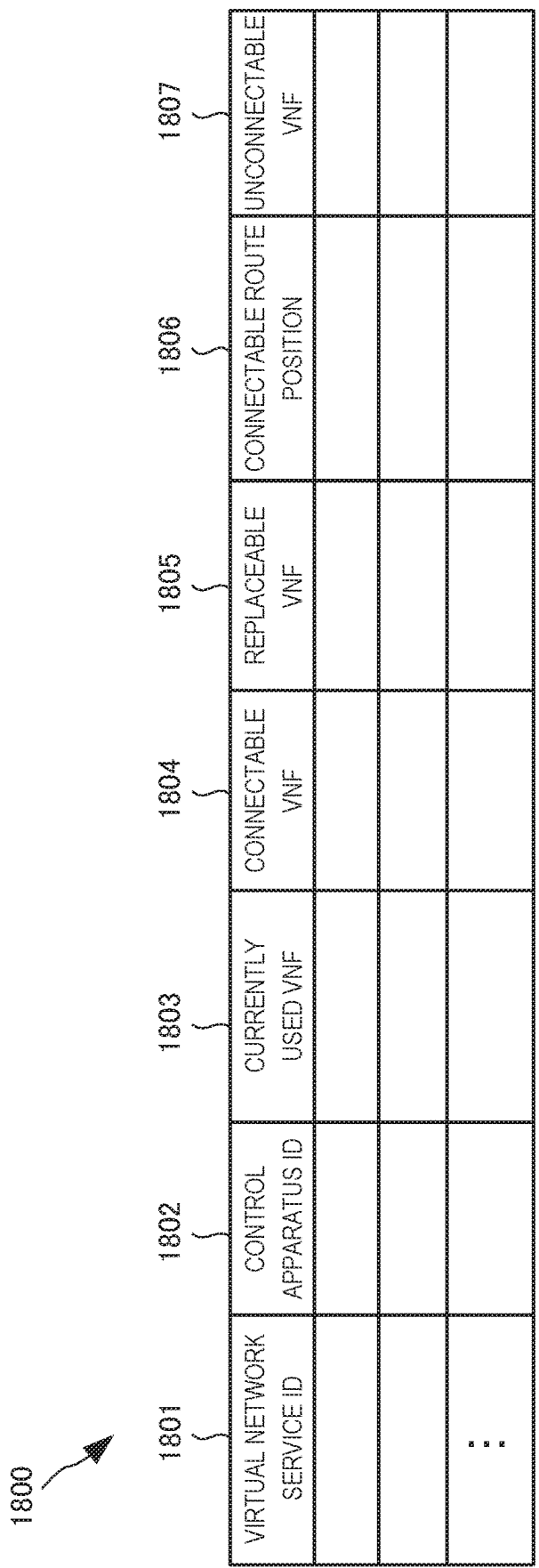
FIG. 18 is a table showing the structure of an integration control table according to the fourth example embodiment of the present invention.

FIG. 18 is a table showing the structure of an integration control table 1800 according to this example embodiment. The integration control table 1800 is used by the orchestration apparatus 1520 to integrally manage the virtual network system 1500. Note that the contents of the integration control table 1800 are not limited to those shown in FIG. 18. The integration control table 1800 can be extended in accordance with the processing contents of the orchestration apparatus 1520.

The integration control table 1800 stores, in association with a virtual network service ID 1801, a control apparatus ID 1802 that controls the virtual network service, a VNF 1803 currently used in the virtual network service, a connectable VNF 1804, and a replaceable VNF 1805. The integration control table 1800 also stores a connectable (or replaceable) route position 1806 and an unconnectable VNF 1807.

<<Processing Procedure of Integration Control Apparatus>>

Figure 19:
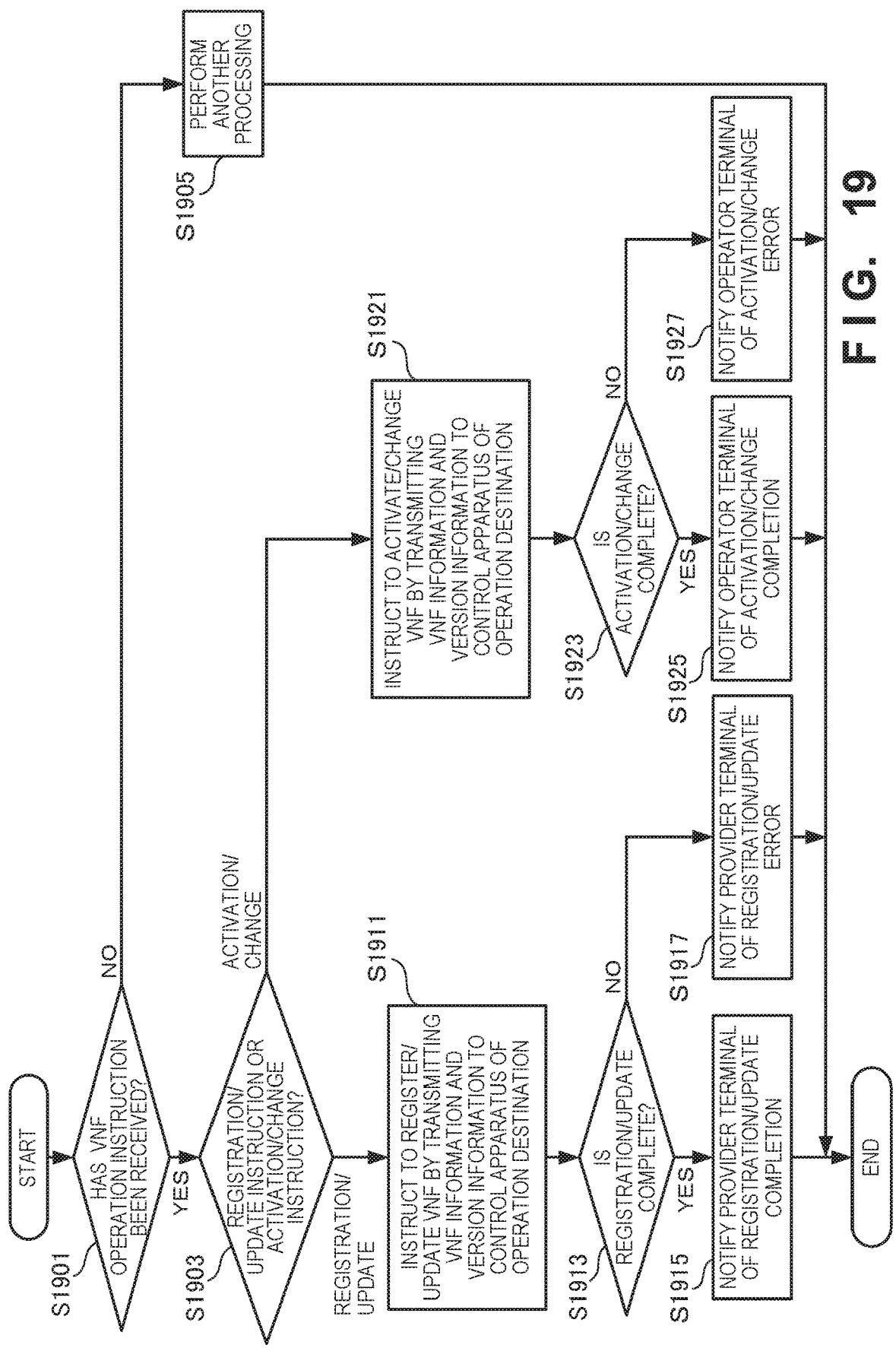
FIG. 19 is a flowchart illustrating the processing procedure of the orchestration apparatus according to the fourth example embodiment of the present invention.

FIG. 19 is a flowchart illustrating the processing procedure of the orchestration apparatus 1520 according to this example embodiment.

In step S1901, the orchestration apparatus 1520 determines whether a VNF operation instruction has been received. If it is determined that a VNF operation instruction has been received, the orchestration apparatus 1520 determines in step S1903 whether the operation instruction is a VNF registration/update or activation/change instruction.

If the operation instruction is a VNF registration/update instruction, the orchestration apparatus 1520 instructs, in step S1911, to register or update a VNF by transmitting VNF information and version information to the control apparatus of the operation destination. In step S1913, the orchestration apparatus 1520 determines whether the VNF registration or update processing is normally complete. If it is determined that the VNF registration or update processing is normally complete, the orchestration apparatus 1520 notifies, in step S1915, the third party terminal that the VNF registration or update processing is normally complete. If it is determined that the VNF registration or update processing is not normally complete, the orchestration apparatus 1520 notifies, in step S1917, the third party terminal that a VNF registration or update error has occurred.

On the other hand, if the operation instruction is a VNF activation/change instruction, the orchestration apparatus 1520 instructs, in step S1921, to activate or change a VNF by transmitting VNF information and version information to the control apparatus of the operation destination. The orchestration apparatus 1520 determines in step S1923 whether the VNF activation or change processing is normally complete. If it is determined that the VNF activation or change processing is normally complete, the orchestration apparatus 1520 notifies, in step S1925, the operator terminal that the VNF activation or change processing is normally complete. If it is determined that the VNF activation or change processing is not normally complete, the orchestration apparatus 1520 notifies, in step S1927, the operator terminal of a VNF activation or change error.

According to this example embodiment, in the virtual network system that implements orchestration, even if an operator is to provide a virtual network service based on a virtual network function produced by a third party, it is possible to select a virtual network function of an appropriate version in each virtual network service, and prevent a malfunction of a virtual network.

Fifth Example Embodiment

A virtual network system according to the fifth example embodiment of the present invention will be described next. The virtual network system according to this example embodiment is different from that according to the fourth example embodiment in that an orchestration apparatus confirms the versions of all virtual network functions, instead of confirming the version of a virtual network function by each control apparatus. The remaining components and operations are the same as those in the second to fourth example embodiments. Hence, the same reference numerals denote the same components and operations, and a detailed description thereof will be omitted.

<<Virtual Network System>>

Figure 20:
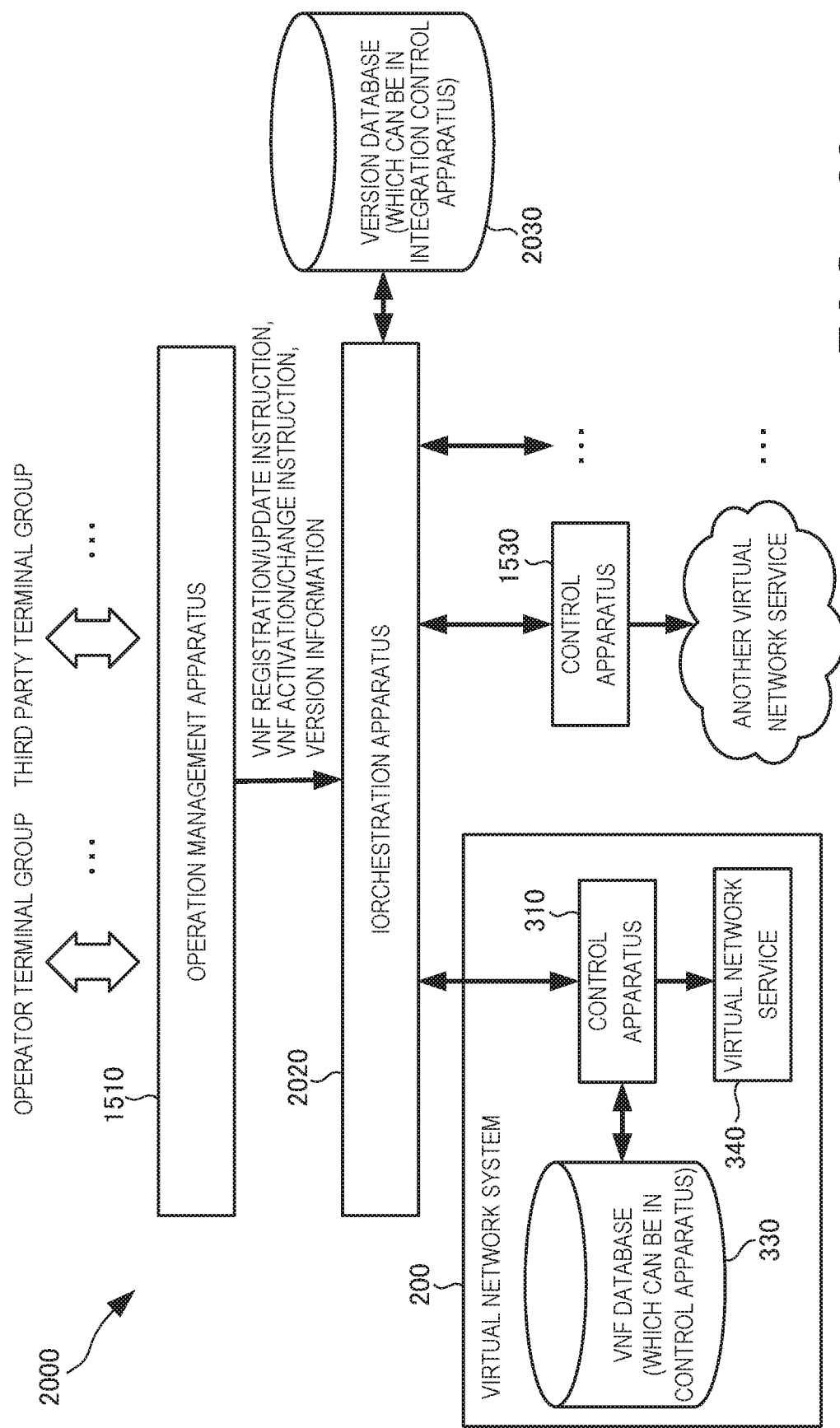
FIG. 20 is a block diagram showing the arrangement of a virtual network system according to the fifth example embodiment of the present invention.

FIG. 20 is a block diagram showing the arrangement of a virtual network system 2000 according to this example embodiment. Note that in FIG. 20, the same reference numerals as those in FIG. 15 denote the same functional components and a description thereof will be omitted.

In the virtual network system 2000, an orchestration apparatus 2020 includes a version database 2030, and authenticates the operations of the VNFs of all the virtual network services of the virtual network system 2000. Therefore, each virtual network system 2010 of the virtual network system 2000 includes no version database.

<<Functional Arrangement of Integration Control Apparatus>>

Figure 21:
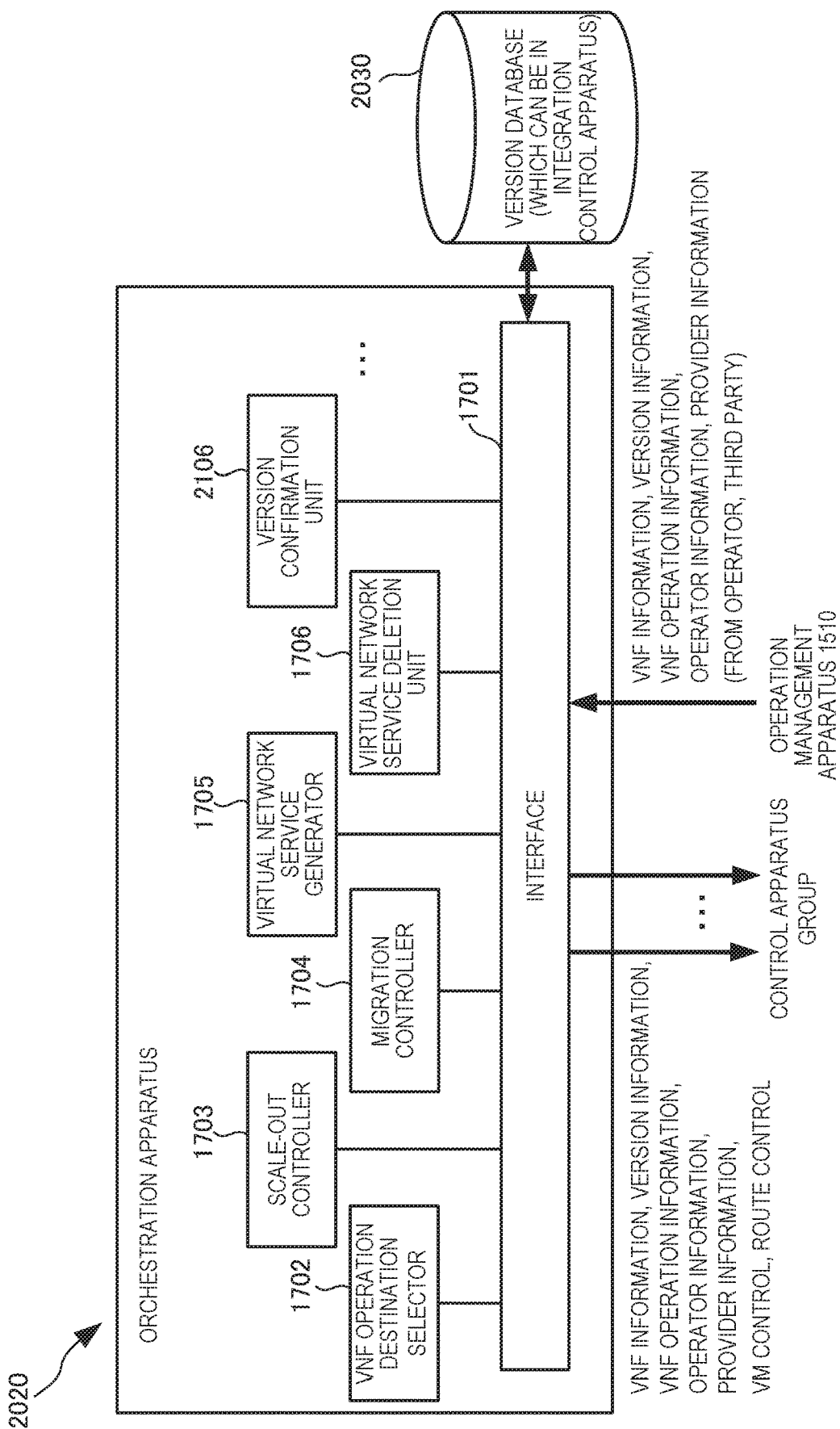
FIG. 21 is a block diagram showing the functional arrangement of an orchestration apparatus according to the fifth example embodiment of the present invention.

FIG. 21 is a block diagram showing the functional arrangement of the orchestration apparatus 2020 according to this example embodiment. In FIG. 21, the same reference numerals as those in FIG. 17 denote the same functional components and a description thereof will be omitted.

The orchestration apparatus 2020 includes a version confirmation unit 2106 that selects and holds an appropriate version of each VNF and confirms the version of a VNF. The version database 2030 is connected via an interface 1701. Note that the version database 2030 may be provided in the orchestration apparatus 2020.

Note that the structure of the version database 2030 is obtained by adding only information for selecting a target virtual network system or service, and can be assumed from the version database 320 shown in FIGS. 7A to 7F, and a detailed illustration and description thereof will be omitted.

<<Another Virtual Network System>>

FIG. 22 is a block diagram showing the arrangement of a virtual network system 2200 according to this example embodiment. FIG. 22 shows an arrangement in which a plurality of virtual network systems 200 and 2201 share a version database 2220. Note that an arrangement in which the plurality of virtual network systems 200 and 2201 share a VNF database may be adopted. In FIG. 22, the same reference numerals as those in FIG. 15 denote the same functional components and a description thereof will be omitted.

The virtual network system 2201 includes a control apparatus 2210, a VNF database 2230, and a virtual network service 2240, and shares the version database 2220 with the virtual network system 200.

Note that the structure of the shared version database 2220 is obtained by adding only information for selecting a target virtual network system or service, and can be assumed from the version database 320 shown in FIGS. 7A to 7F, and a detailed illustration and description thereof will be omitted.

According to this example embodiment, in the virtual network system that implements orchestration, even if an operator is to provide a virtual network service based on a virtual network function produced by a third party, it is possible to select a virtual network function of an appropriate version with a small number of components, and prevent a malfunction of a virtual network.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a control program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

This application claims the benefit of Japanese Patent Application No. 2015-019798, filed on Feb. 3, 2015, which is hereby incorporated by reference in its entirety.

The invention claimed is:

1. A virtual network system comprising:
a first storage configured to store a list including identification information identifying multiple defined functions of virtual network functions, each defined function of the virtual network functions being in association with whether, when activating or changing the each defined function of the virtual network functions, version information of the each defined function to be activated or changed is compatible with version information of the virtual network functions currently in use of a virtual network service, one of the multiple defined functions of virtual network functions providing one of various functions included in the virtual network service, respectively;
a second storage configured to separately store the multiple defined functions of virtual network functions, each defined function of the virtual network functions having plural sets of different version information and corresponding virtual network function data; and
a controller configured to:
receive an instruction which represents activation or change of a candidate defined function of virtual network function, among the multiple defined functions of virtual network functions;
compare version information compatible with the version information of the virtual network functions currently in use of the virtual network service stored in association with the candidate defined function of virtual network function in the first storage with a plurality of the different version information stored in association with the candidate defined function of virtual network function in the second storage; and
perform the activation or the change of the candidate defined function of virtual network function in response to a match between the compatible version information and any one of the plurality of the different version information, and terminate the activation or the change of the candidate defined function of virtual network function in response to a mismatch between the compatible version information and any of the plurality of the different version information of the candidate defined function of virtual network function.

2. The virtual network system according to claim 1, further comprising a registration apparatus configured to register each of the multiple defined functions of virtual network functions and the corresponding compatible version information,
wherein the first storage is configured to store the registered version information.

3. The virtual network system according to claim 2, wherein the registration apparatus is further configured to register operator information representing an operator who has instructed the activation or change of the candidate defined function of virtual network function, and
the controller is further configured to perform the activation or the change of the candidate defined function of virtual network function based on the compatible version information and the operator information.

4. The virtual network system according to claim 1, wherein the controller is further configured to confirm the candidate defined function of virtual network function based on the compatible version information and a provider of the virtual network function.

5. The virtual network system according to claim 1, wherein the controller is further configured to confirm the candidate defined function of virtual network function based on the compatible version information and an operator who has instructed the activation or change of the candidate defined function of virtual network function.

6. The virtual network system according to claim 1, wherein the first storage is further configured to store authentication information, and
the controller is further configured to perform the activation or the change of the candidate defined function of virtual network function in response to a status that the candidate defined function of virtual network function corresponds to the compatible version information and the authentication information.

7. The virtual network system according to claim 6, wherein the authentication information includes a digital signature.

8. The virtual network system according to claim 7, wherein the controller is further configured to decrypt the digital signature by a verification key held in correspondence with the candidate defined function of virtual network function or a provider of the candidate defined function of virtual network function.

9. The virtual network system according to claim 7, wherein the controller is further configured to decrypt the digital signature by a verification key held in correspondence with the candidate defined function of virtual network function and a provider of the candidate defined function of virtual network function.

10. The virtual network system according to claim 7, wherein the controller is further configured to decrypt the digital signature by a verification key held in correspondence with an operator who has input activation or change of the candidate defined function of virtual network function.

11. The virtual network system according to claim 1, wherein the controller is further configured to identify a network function based on the virtual network service.

12. The virtual network system according to claim 1, further comprising a physical server including a virtual machine which performs the virtual network function,
wherein the controller is configured to control the virtual machine.

13. The virtual network system according to claim 1, further comprising a management apparatus configured to send the instruction to the controller.

14. The virtual network system according to claim 1, further comprising:
a plurality of controllers, and
an orchestration controller configured to integrally control the plurality of controllers.

15. The virtual network system according to claim 1, wherein the controller configured to:
perform a first extraction operation to extract a first version information associated with the candidate defined function of virtual network function from the first storage; and
perform a second extraction operation to extract a second version information associated with the candidate defined function of virtual network function from the second storage.

16. The virtual network system according to claim 1, wherein the compatible version information is a latest version of the corresponding virtual network function.

17. A control apparatus comprising:
a memory configured to store program instructions; and
a processor configured to execute the program instructions to:
receive an instruction which represents activation or change of a candidate defined function of virtual network function, among a multiple defined functions of virtual network functions;
compare version information compatible with the version information of the virtual network functions currently in use of the virtual network service stored in association with the candidate defined function of virtual network function in a first storage with a plurality of a different version information stored in association with the candidate defined function of virtual network function in a second storage; and
perform the activation or the change of the candidate defined function of virtual network function in response to a match between the compatible version information and any one of the plurality of the different version information, and terminate the activation or the change of the candidate defined function of virtual network function in response to a mismatch between the compatible version information and any of the plurality of the different version information of the candidate defined function of virtual network function,
wherein the first storage is configured to store a list including identification information multiple defined functions of virtual network functions, each defined function of the virtual network functions being in association with whether, when activating or changing the each defined function of the virtual network functions, version information of the each defined function to be activated or changed is compatible with version information of the virtual network functions currently in use of a virtual network service, one of the multiple defined functions of virtual network functions providing one of various functions included in the virtual network service, respectively, and
wherein the second storage configured to separately store the multiple defined functions of virtual network functions, each defined function of the virtual network functions having plural set of different version information and corresponding virtual network function data.

18. The control apparatus according to claim 17, wherein the processor is configured to execute further instructions to identify a network function based on the virtual network service.

19. The control apparatus according to claim 17, wherein the processor is configured to execute further instructions to receive the instruction from a management apparatus.

20. A communication method comprising:
receiving an instruction which represents activation or change of a candidate defined function of virtual network function, among a multiple defined functions of virtual network functions;
comparing version information compatible with the version information of the virtual network functions currently in use of the virtual network service stored in association with the candidate defined function of virtual network function in a first storage with a plurality of a different version information stored in association with the candidate defined function of virtual network function in a second storage; and
performing the activation or the change of the candidate defined function of virtual network function in response to a match between the compatible version information and any one of the plurality of the different version information and terminate the activation or the change of the candidate defined function of virtual network function in response to a mismatch between the compatible version information and any of the plurality of the different version information of the candidate defined function of virtual network function,
wherein the first storage is configured to store a list including identification information multiple defined functions of virtual network functions, each defined function of the virtual network functions being in association with whether, when activating or changing the each defined function of the virtual network functions, version information of the each defined function to be activated or changed is compatible with version information of the virtual network functions currently in use of a virtual network service, one of the multiple defined functions of virtual network functions providing one of various functions included in the virtual network service, respectively, and
wherein the second storage configured to separately store the multiple defined functions of virtual network functions, each defined function of the virtual network functions having plural set of different version information and corresponding virtual network function data.

21. The communication method according to claim 20, further comprising identifying a network function based on the virtual network service.

22. The communication method according to claim 20, further comprising receiving the instruction from a management apparatus.

* * * * *